United States Patent [19]

Kuranaga et al.

[11] Patent Number: 5,602,706
[45] Date of Patent: Feb. 11, 1997

[54] DOUBLE-CASSETTE-TYPE MAGNETIC RECORDING-REPRODUCTION APPARATUS

[75] Inventors: Hiroshi Kuranaga; Hiroshi Furuhara, both of Higashihiroshima, Japan

[73] Assignee: Sharp Kabushiki Kaisha, Osaka, Japan

[21] Appl. No.: 431,411

[22] Filed: Apr. 28, 1995

[30] Foreign Application Priority Data

Dec. 27, 1994 [JP] Japan .................... 6-326352

[51] Int. Cl.$^6$ .................... G11B 5/008; G11B 15/00; G11B 15/68; G11B 17/00
[52] U.S. Cl. .................... 360/137; 360/91; 360/92; 360/93
[58] Field of Search .................... 360/137, 93, 92, 360/91

[56] References Cited

U.S. PATENT DOCUMENTS

| | | | |
|---|---|---|---|
| 4,551,775 | 11/1985 | Koizumi et al. | 360/93 |
| 4,589,607 | 5/1986 | Kobayashi et al. | 360/91 |
| 5,151,834 | 9/1992 | Koizumi | 360/92 |

FOREIGN PATENT DOCUMENTS 6-195809  7/1994  Japan .

*Primary Examiner*—Robert S. Tupper
*Assistant Examiner*—Adriana Giordana

[57] ABSTRACT

A double-cassette-type magnetic recording-reproduction apparatus wherein a cam gear allows the second over-stroke lever to shift in advancing and retracting manners and, following these movements, a mode lever and the second head mount are allowed to move to the first through third positions. When the mode lever is located at the first position, the first over-stroke lever is shifted to an operable position and the second head mount is blocked by the second idler lever from its advancing movement. When the mode lever is located at the second position, the shift-blocking state of the second head mount is released, and the first over-stroke lever is not allowed to shift. When the mode lever is located at the third position, the first over-stroke lever and the second head mount are allowed to shift to the operable positions. This construction makes it possible to reduce the number of driving means and cut the cost of production.

15 Claims, 32 Drawing Sheets

FIG. 8
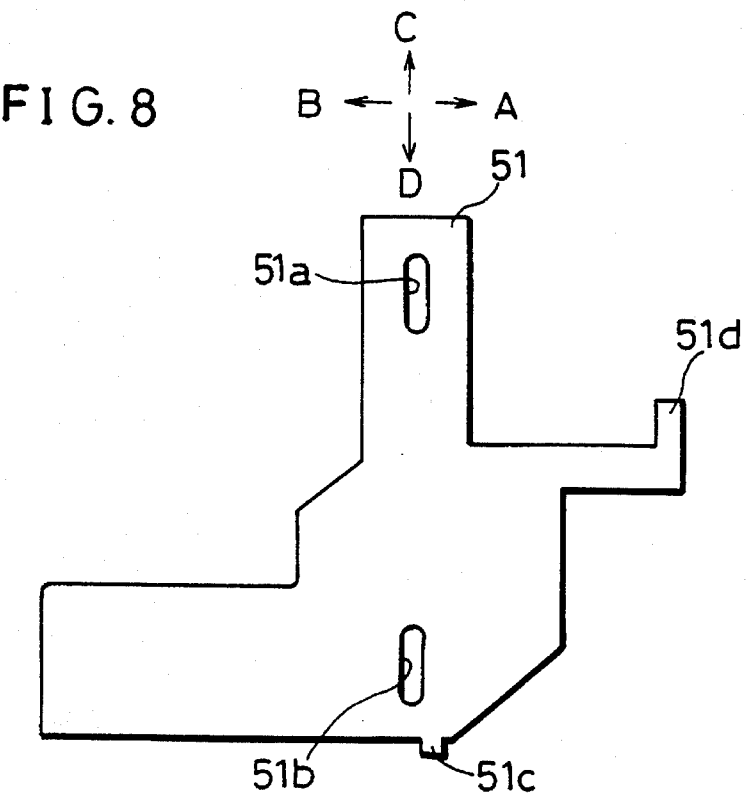
FIG. 9(b)
FIG. 9(a)
FIG. 9(c)
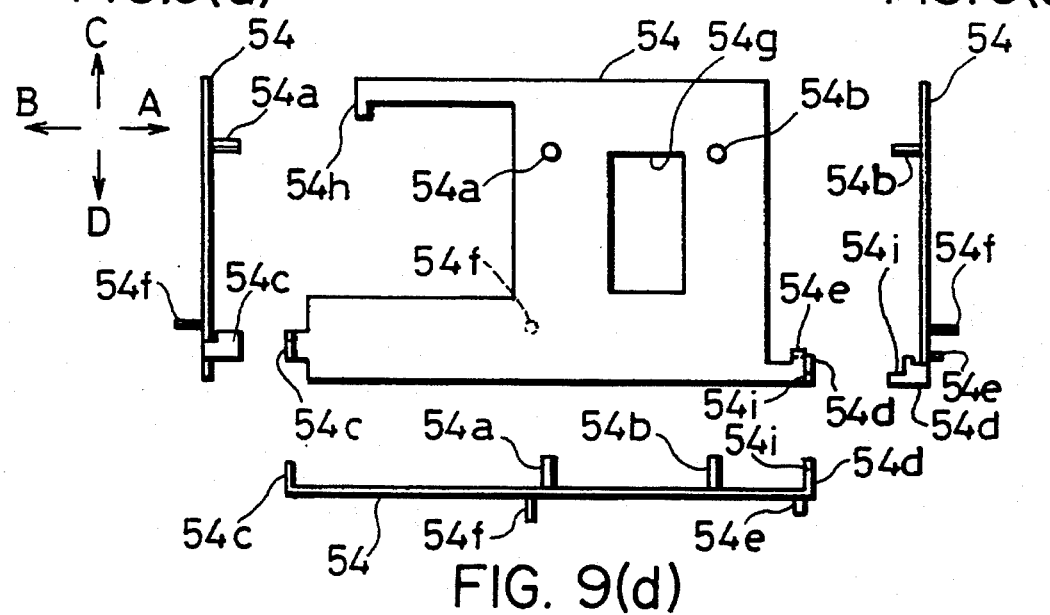
FIG. 9(d)

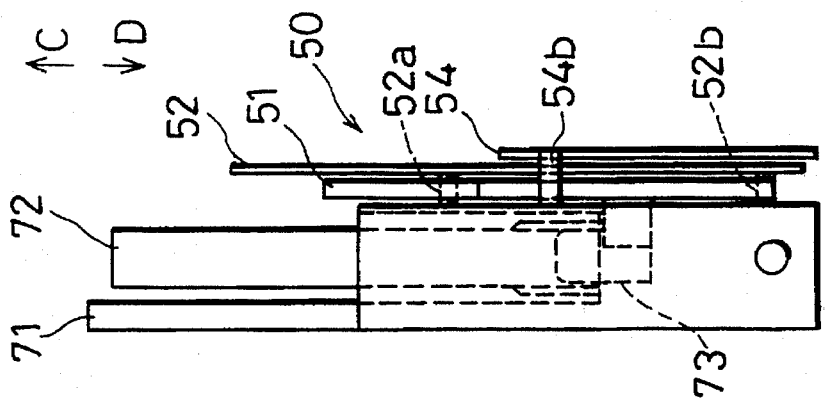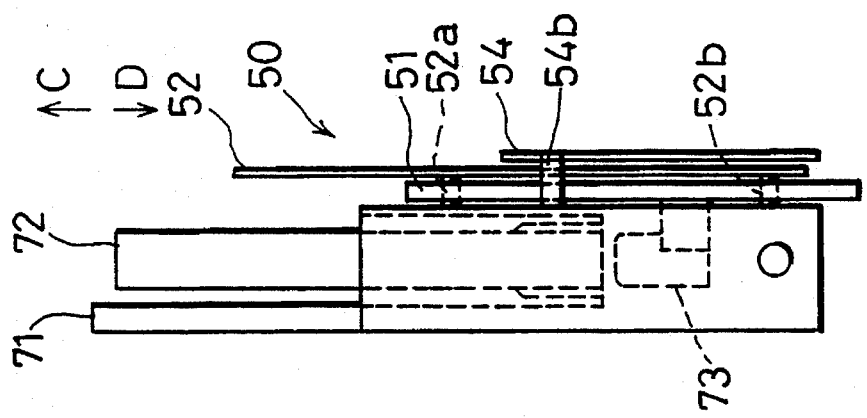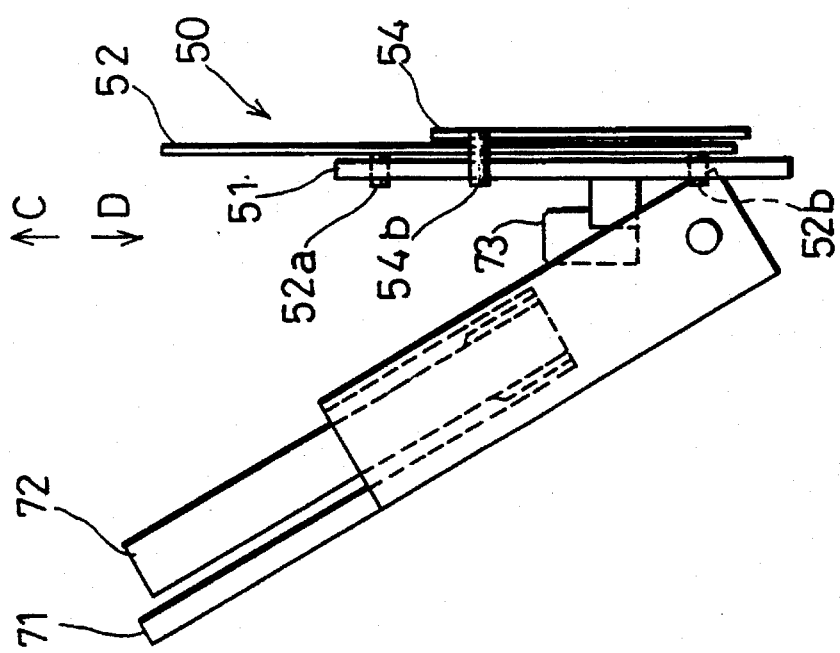

5,602,706

DOUBLE-CASSETTE-TYPE MAGNETIC RECORDING-REPRODUCTION APPARATUS

FIELD OF THE INVENTION

The present invention relates to a double-cassette-type magnetic recording-reproduction apparatus which is capable of accepting two cassette tapes on its right-hand side and left-hand side and driving these tapes at the same time.

BACKGROUND OF THE INVENTION

As shown in FIG. 37, a conventional double-cassette-type magnetic recording-reproduction apparatus is provided with a tape transport mechanism 301, a driving circuit 302, a control circuit 303 and an input operation section 304. The tape transport mechanism 301 is used for driving cassette tapes, and the driving circuit 302 drives the tape transport mechanism 301. The control circuit 303, which has a microcomputer, controls the operations of the tape transport mechanism 301 by controlling the driving circuit 302. The input operation section 304 gives instructions to the control circuit 303 so that it conducts various operations.

The tape transport mechanism 301 includes the first and second mechanisms (hereinafter, referred to as mechanism sections) 310 and 330 for driving the first and second cassette tapes respectively. The first-mechanism section 310 is provided with the first-mechanism motor 311 and the first-mechanism solenoid 312 and the second-mechanism section 330 is provided with the second-mechanism motor 331 and the second-mechanism solenoid 332.

The input operation section 304 is provided with: a dubbing button 304a, the first-mechanism playback button 304b, the first-mechanism fast-forward button 304c, the first-mechanism rewind button 304d, the second-mechanism playback button 304e, the second-mechanism fast-forward button 304f, the second-mechanism rewind button 304g and a stop button 304h. In other words, this magnetic recording-reproduction apparatus has functions, such as playback, fast-forward, rewind and stop functions, for the first cassette tape that are carried out by the first-mechanism section 310 as well as having functions, such as playback, fast-forward, rewind and stop functions, for the second cassette tape that are carried out by the second-mechanism section 330. Further, the magnetic recording-reproduction apparatus also has a dubbing function by which a reproducing operation from the first cassette tape and a recording operation on the second cassette tape for the reproduced signals are carried out at the same time.

The respective buttons 304a through 304h have switches, and when the user operates any of these buttons 304a through 304h, a signal that is inherent to the button 304a–304h in question is inputted to the control circuit 303. Thus, the control circuit 303 controls the driving circuit 302, that is, the tape transport mechanism 301 so that the operation corresponding to the operated button 304a–304h is carried out.

As illustrated in FIG. 38, the tape transport mechanism 301 is assembled on a base plate 305. FIG. 38 shows the first-mechanism section 310 and the second-mechanism section 330 in their stopped state. In addition to the first-mechanism motor 311 (not shown) and the first-mechanism solenoid 312, the first-mechanism section 310 is provided with the first head board 313, the first over-stroke lever 314, the first over-stroke-lever spring 315, the first solenoid lever 316, and the first cam gear 317 that is urged to rotate clockwise.

Similarly, in addition to the second-mechanism motor 331 (not shown) and the second-mechanism solenoid 332, the second-mechanism section 330 is provided with the second head board 333, the second over-stroke lever 334, the second over-stroke-lever spring 335, the second solenoid lever 336, and the second cam gear 337 that is urged to rotate clockwise.

In the stopped state shown in FIG. 38, for example, when the user operates the first-mechanism playback button 304b, a signal corresponding to this button operation is inputted to the control circuit 303, and the first-mechanism section 310, which is controlled by the control circuit 303, carries out the following operations.

First, the first-mechanism motor 311 is activated, and after a lapse of a predetermined time allowed for the motor 311 to reach a predetermined rotating speed, the first-mechanism solenoid 312, which has received the signal from the control circuit 303, attracts a movable iron core 312a. Thus, the first solenoid lever 316, engaged with the movable iron core 312a, rotates clockwise to release the engagement between the engaging member 316a of the first solenoid lever 316 and the engaging member 317a of the first cam gear 317, thereby allowing the first cam gear 317 to start rotating clockwise.

As illustrated in FIG. 39, through this rotation, the cam 317c of the first cam gear 317 is engaged by the cam engaging shaft 314a of the first over-stroke lever 314, and the first over-stroke lever 314 is shifted in the direction of arrow C. At this time, the first head board 313, which is arranged to move integrally with the first over-stroke lever 314 through the first over-stroke-lever spring 315, is shifted in the direction of arrow C in the same manner.

Thereafter, the engaging member 316a of the first solenoid lever 316 that has returned to its original state after completion of power supply to the first-mechanism solenoid 312 is engaged by the engaging member 317b of the first cam gear 317 so that the first cam gear 317 is stopped in its rotation. Thus, the first-mechanism section 310 is brought into a driving state, that is, an operable state for playback.

Moreover, in the stopped state shown in FIG. 38, for example, when the user operates the second-mechanism playback button 304e, a signal corresponding to this button operation is inputted to the control circuit 303, and the second-mechanism section 330, which is controlled by the control circuit 303, carries out the following operations in the same manner as in the first-mechanism section 310.

First, the second-mechanism motor 331 is activated, and after a lapse of the predetermined time, the second-mechanism solenoid 332, which has received the signal from the control circuit 303, attracts a movable iron core 332a. Thus, the second solenoid lever 336, engaged with the movable iron core 332a, rotates clockwise to release the engagement between the engaging member 336a of the second solenoid lever 336 and the engaging member 337a of the second cam gear 337, thereby allowing the second cam gear 337 to start rotating clockwise.

As illustrated in FIG. 39, through this rotation, the cam 337c of the second cam gear 337 is engaged by the cam engaging shaft 334a of the second over-stroke lever 334, and the second over-stroke lever 334 is shifted in the direction of arrow C. At this time, the second head board 333, which is arranged to move integrally with the second over-stroke lever 334 through the second over-stroke-lever spring 335, is shifted in the direction of arrow C.

Thereafter, the engaging member 336a of the second solenoid lever 336 that has returned to its original state after completion of power supply to the second-mechanism solenoid 332 is engaged by the engaging member 337b of the second cam gear 337 so that the second cam gear 337 is stopped in its rotation. Thus, the second-mechanism section 330 is brought into a driving state, that is, an operable state for playback.

Furthermore, in the stopped state shown in FIG. 38, for example, when the user operates the dubbing button 304a, a signal corresponding to this button operation is inputted to the control circuit 303, and under control by the control circuit 303, the first-mechanism section 310 and the second-mechanism section 330 respectively carry out the same operations as those carried out when the first-mechanism and second-mechanism playback buttons are operated.

However, in the above-mentioned conventional double-cassette-type magnetic recording-reproduction apparatus, the first-mechanism section 310 and the second-mechanism section 330 are individually provided with dedicated driving sources, such as the first-mechanism motor 311 and the first-mechanism solenoid 312 as well as the second-mechanism motor 331 and the second-mechanism solenoid 332, and these driving sources have to be controlled individually by control signals from the control circuit 303. Consequently, the problems of the conventional arrangement are that a number of driving sources are required, that the number of parts increases, and that the cost of production is expensive.

SUMMARY OF THE INVENTION

The objective of the present invention is to provide a double-cassette-type magnetic recording-reproduction apparatus which is assembled by using fewer driving means and which is capable of reducing the cost of production.

In order to solve the above-mentioned objective, the double-cassette-type magnetic recording-reproduction apparatus of the present invention is provided with: a first shifting member that is shiftable in advancing and retracting manners to an operable position that allows a magnetic tape in the first cassette to be subjected to at least a recording operation or a reproducing operation as well as to an inoperable position from which the above-mentioned operations are not available; a second shifting member that is shiftable in advancing and retracting manners to an advanced position that permits a third shifting member to be located at an operable position that allows a magnetic tape in the second cassette to be subjected to at least a recording operation or a reproducing operation as well as to a retracted position that permits the third shifting member to be located at an inoperable position from which the above-mentioned operations are not available; a third shifting member that is shiftable in advancing and retracting manners to the operable position and to the inoperable position following the movement of the second shifting member; a shift-blocking member that is shiftable to a shift-blocking position for blocking the movement of the third shifting member toward the operable position; an operation-switching member that is shiftable to a first position that permits the first shifting member to be shifted to the operable position following the movement of the second shifting member to the advanced position as well as to a second position that prohibits the first shifting member from being shifted to the operable position, the operation-switching member being shifted in advancing and retracting manners following the movement of the second shifting member; and a driving means for shifting the second shifting member to the advanced position as well as to the retracted position and for shifting the operation-switching member to the first position as well as to the second position.

In accordance with the above-mentioned arrangement, when the operation-switching member, driven by the driving means, is shifted to the first position and the second shifting member is shifted to the advanced position, the first shifting member is shifted to the operable position that allows the magnetic tape of the first cassette to be subjected to at least a recording operation or a reproducing operation, following the movement of the second shifting member. In contrast, since the shift-blocking member is shifted to the shift-blocking position, the third shifting member is not allowed to move to the operable position that allows the magnetic tape of the second cassette to be subjected to at least a recording operation or a reproducing operation. Thus, the magnetic tape of the first cassette is subjected to at least a recording operation or a reproducing operation, while the magnetic tape of the second cassette is not allowed to be subjected to at least a recording operation or a reproducing operation.

Moreover, even if the operation-switching- member, driven by the driving means, is shifted to the second position and the second shifting member is shifted to the advanced position, the first shifting member is not allowed to move to the operable position. In contrast, since the shift-blocking member is not shifted to the shift-blocking position, the third shifting member is allowed to move to the operable position that allows the magnetic tape of the second cassette to be subjected to at least a recording operation or a reproducing operation, following the movement of the second shifting member. Thus, the magnetic tape of the first cassette is not allowed to be subjected to at least a recording operation or a reproducing operation, while the magnetic tape of the second cassette is subjected to at least a recording operation or a reproducing operation.

As described above, the magnetic recording-reproduction apparatus of the present invention makes it possible to conduct at least a recording operation or a reproduction operation on the magnetic tapes in the first and second cassettes by using one pair of driving means. Accordingly, it is possible to assemble the present magnetic recording-reproduction apparatus by using fewer driving means and to reduce the cost of production.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a plan view showing the shape of the second head board shown in FIG. 1.

FIG. 9(a) is a left-side view of the mode lever shown in FIG. 1; FIG. 9(b) is a plan view of the same; FIG. 9(c) is a right-side view of the same; and FIG. 9(d) is a front view of the same.

FIG. 17(a) is a schematic side view showing the second-mechanism section and the vicinity thereof in a state where a cassette tape is placed into an opened cassette holder; FIG. 17(b) is a schematic side view showing the second-mechanism section and the vicinity thereof in a state where the cassette tape is loaded in the magnetic recording-reproduction apparatus with the cassette holder closed; and FIG. 17(c) is a schematic side view showing the second-mechanism section and the vicinity thereof in a state where the cassette tape is brought into contact with a magnetic head.

DESCRIPTION OF THE EMBODIMENTS

Referring to FIGS. 1 through 36, the following description will discuss one embodiment of the present invention.

Figure 2:
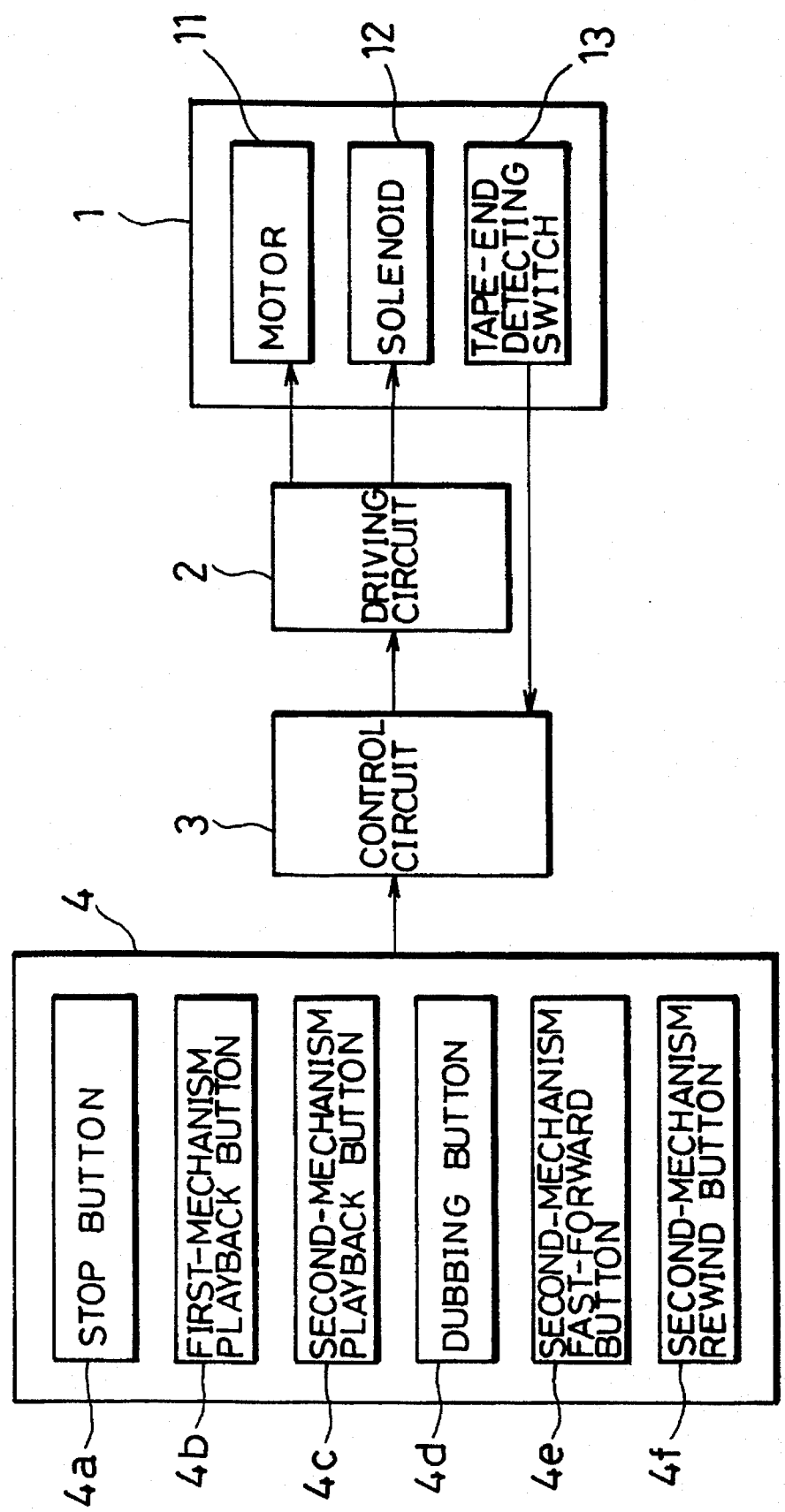
FIG. 2 is a schematic block diagram showing an entire structure of the magnetic recording-reproduction apparatus.

As shown in FIG. 2, a double-cassette-type magnetic recording-reproduction apparatus of the present embodiment is provided with a tape transport mechanism 1, a driving circuit 2, a control circuit 3 and an input operation section 4. The tape transport mechanism 1 is used for driving cassette tapes, and the driving circuit 2 drives the tape transport mechanism 1. The control circuit 3, which has a microcomputer, controls the operations of the tape transport mechanism 1 by controlling the driving circuit 2. The input operation section 4 gives instructions to the control circuit 3 so that it conducts various operations.

The tape transport mechanism 1 is provided with a motor 11, a solenoid 12 and a tape-end detecting switch 13, and is also provided with the first and second mechanisms (hereinafter, referred to as mechanism sections) 20 and 50 for driving the first and second cassette tapes respectively, which will be described later.

The input operation section 4 is provided with: a stop button 4a, the first-mechanism playback button 4b, the second-mechanism playback button 4c, a dubbing button 4d, the second-mechanism fast-forward button 4e, and the second-mechanism rewind button 4f. Thus, the magnetic recording-reproduction apparatus of the present embodiment has playback and stop functions for the first cassette tape that are carried out by the first-mechanism section 20 as well as having playback, fast-forward, rewind and stop functions for the second cassette tape that are carried out by the second-mechanism section 50. Further, the magnetic recording-reproduction apparatus also has a dubbing function by which a reproducing operation from the first cassette tape and a recording operation on the second cassette tape for the reproduced signals are carried out at the same time.

Figure 3:
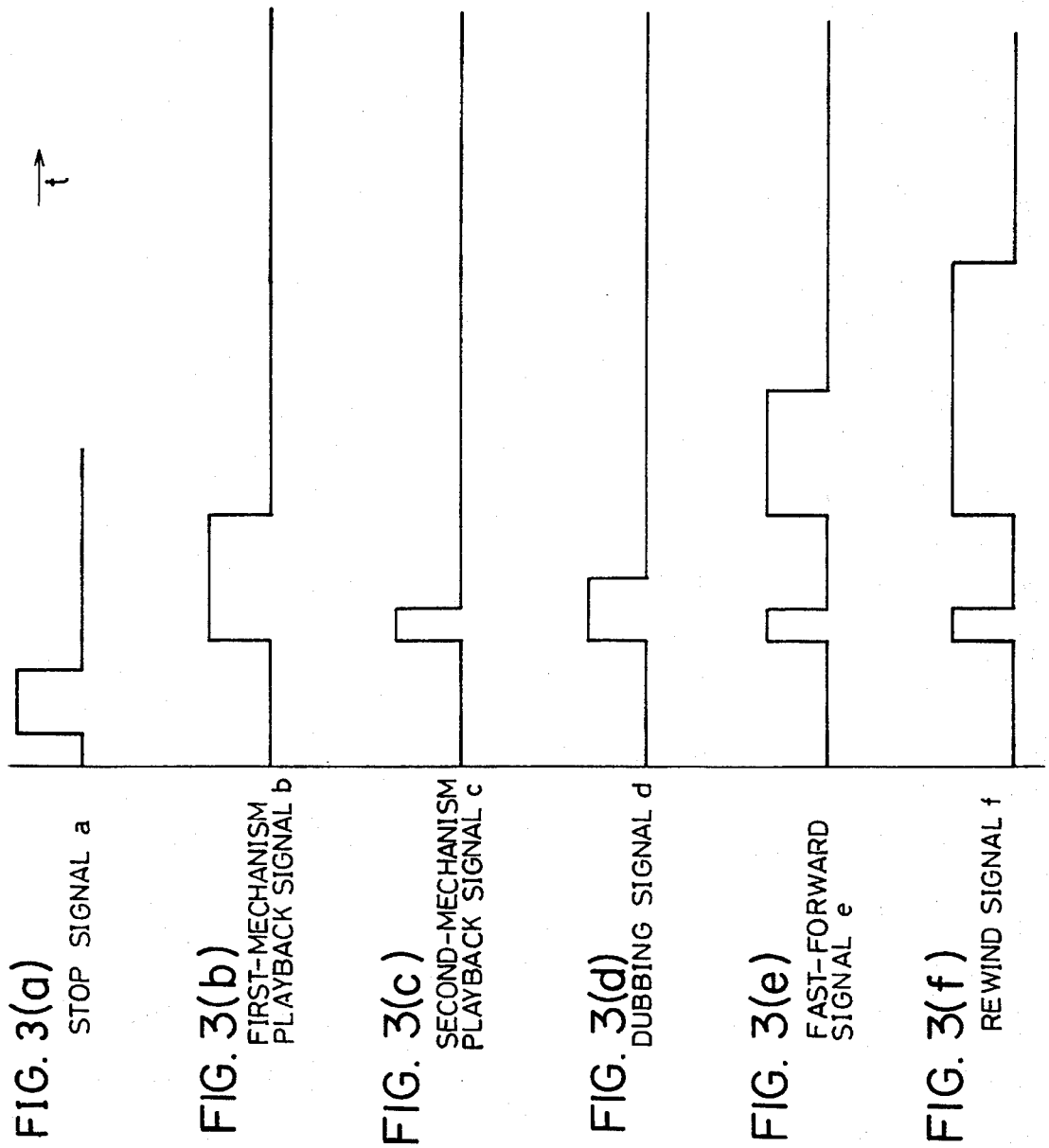
FIG. 3 is a drawing indicating waveforms of voltages to be supplied to a solenoid shown in FIG. 2.

The respective buttons 4a through 4f have switches, and when the user operates any of these buttons 4a through 4f, a signal that is inherent to the button 4a–4f in question is inputted to the control circuit 3. Thus, the control circuit 3 supplies a pulse signal to the solenoid 12 through the driving circuit 2. Here, FIG. 3 shows respective pulse signals used in this case. In accordance with the pulse signal, the control circuit 3 controls the tape transport mechanism 1 so that the operation that is instructed through the operated button 4a–4f is carried out.

In the present double-cassette-type magnetic recording-reproduction apparatus, the following modes (1) through (6) can be selected by operating the respective buttons 4a through 4f in the input operation section 4.

(1) Stop mode (2) First-mechanism playback mode (3) Second-mechanism playback mode (4) Dubbing mode (5) Second-mechanism fast-forward mode (6) Second-mechanism rewind mode Additionally, in the dubbing mode, the first-mechanism section 20 is brought into an operable state for playback and the second-mechanism section 50 is brought into an operable state for recording; thus, reproduced signals from the first cassette tape are allowed to be recorded on the second cassette tape.

Figure 1:
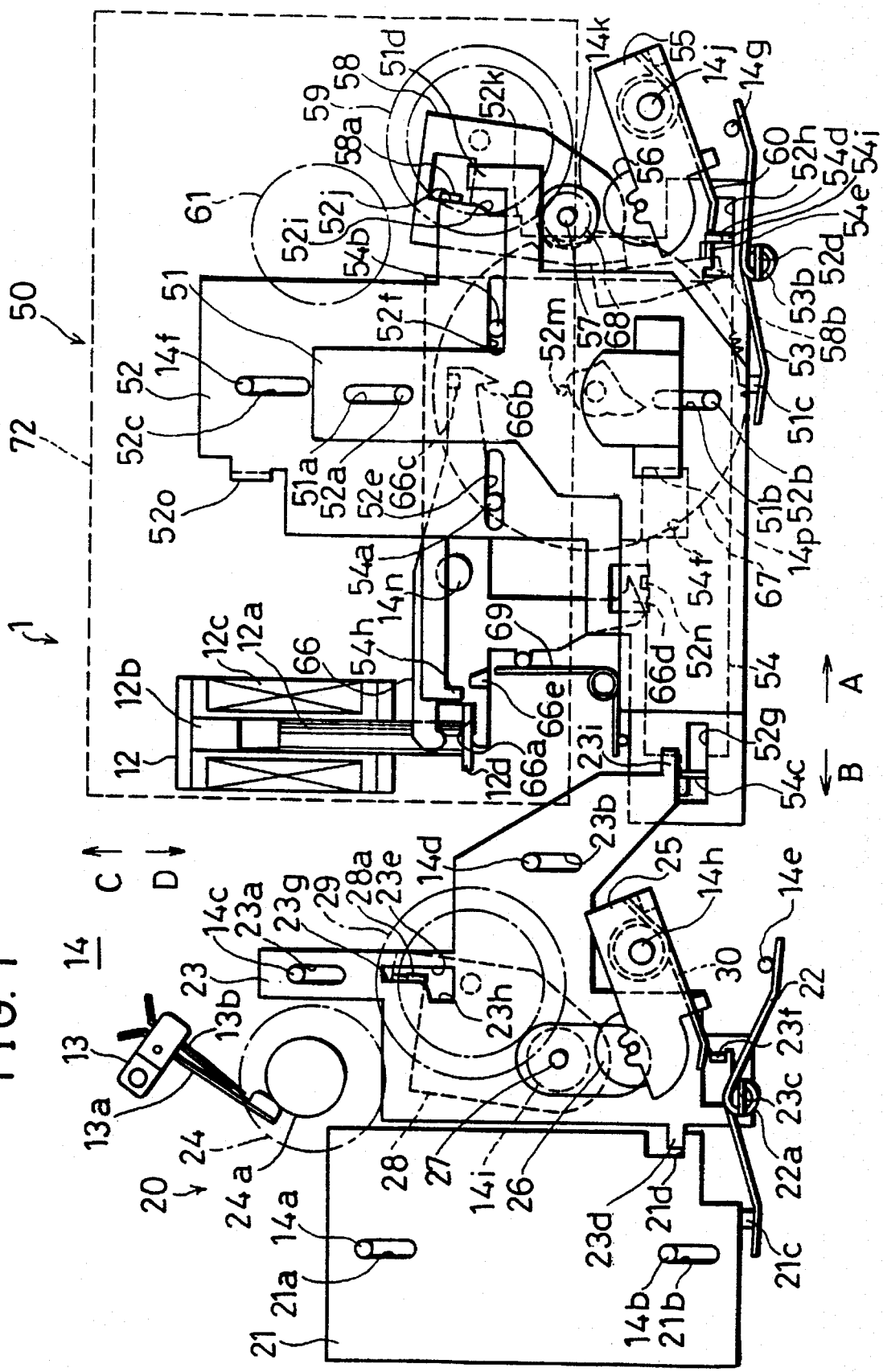
FIG. 1, which shows structures of the first and second-mechanism sections of a double-cassette-type magnetic recording-reproduction apparatus in one embodiment of the present invention, is a plan view indicating a stopped mode of the first and second-mechanism sections.

The tape transport mechanism 1, which is arranged as shown by a plan view in FIG. 1, has the motor 11 (not shown in FIG. 1), the solenoid 12 and the tape-end detecting switch 13, as well as having the first mechanism section 20 functioning as the first mechanical section and the second mechanism section 50 functioning as the second mechanical section. These first and second-mechanism sections 20 and 50 are disposed on the right side and the left side in FIG. 1.

The first-mechanism section 20 is provided with the first head board 21, the first over-stroke-lever spring 22 provided as a resilient member, the first over-stroke lever 23 provided as the first shifting member, the first take-up reel mount 24, the first pinch-roller lever 25, the first pinch roller 26, the first capstan 27, the first idler lever 28, and the first idler gear 29.

The first head board 21, which receives a magnetic head (not shown) on its surface, has guide holes 21a and 21b at its end portions in the direction of arrow C and in the direction of arrow D, which respectively extend in the directions of arrows C and D. Guide pins 14a and 14b of a base plate 14 are respectively inserted into these guide holes 21a and 21b, and the first head board 21 is thus shiftable in the directions of arrows C and D.

Figure 7:
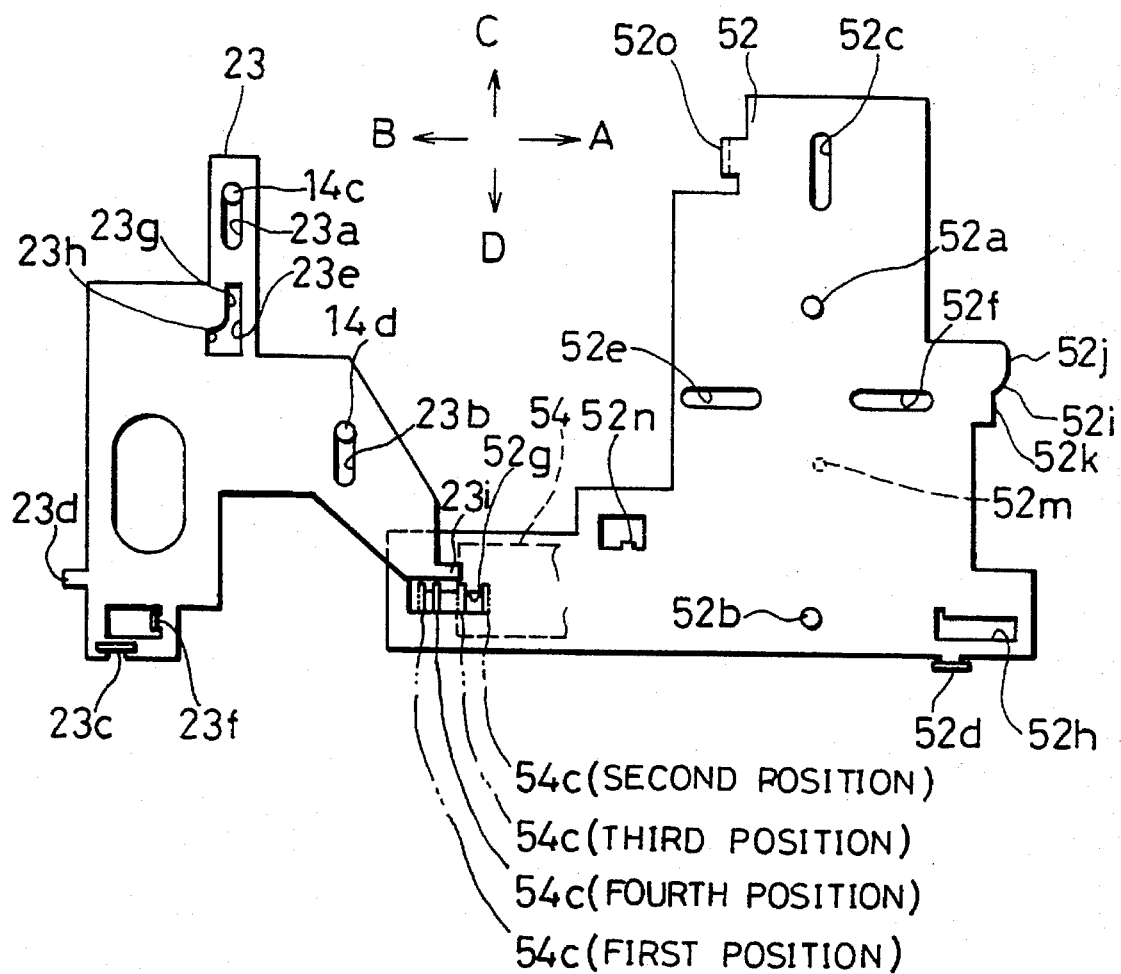
FIG. 7 is a plan view showing the shapes of the first over-stroke lever and the second over-stroke lever illustrated in FIG. 1, as well as showing possible positions of the mode lever.

The first over-stroke lever 23, which has a shape as shown in FIG. 7, is placed between the first head board 21 and the second-mechanism section 50 as shown in FIG. 1. The first over-stroke lever 23 has guide holes 23a and 23b at its portions on the direction C side and on the direction D side, which respectively extend in the directions of arrows C and D. Guide pins 14c and 14d of the base plate 14 are respectively inserted into these guide holes 23a and 23b, and the first over-stroke lever 23 is thus shiftable in the directions of arrows C and D. Further, the first over-stroke lever 23 also has a guide hole 23e at its portion on the direction C side, an engaging member 23f at its portion on the direction D side that is provided as a notched and bent member, and an engaging member 23i at its portion on the direction A side. The guide hole 23e has a shape wherein an allowable section 23h, located on the D direction side, extends in the direction of arrow B with respect to a blocking section 23g located on the direction C side.

The first over-stroke-lever spring 22 is fixed to the over-stroke lever 23 by inserting its coil section 22a into a fixing member 23c of the over-stroke lever 23 that is provided as a notched and bent member at its end portion on the direction D side. The first over-stroke-lever spring 22 has its one end engaged by a shaft 14e of the base plate 14, and has the other end engaged by a stopping end 21c of the first head board 21. Therefore, the first over-stroke lever 23 is always urged in the direction of arrow D by the first over-stroke-lever spring 22. Moreover, the first over-stroke lever 23 has a protruding portion 23d at its side edge portion on the first head board 21 side, and the protruding portion 23d is positioned in a cutout section 21d of the first head board 21. Therefore, the first head board 21 and the first over-stroke lever 23 is allowed to shift integrally in the directions of arrows C and D.

The first take-up reel mount 24, which engages the reel of the first cassette tape so as to rewind the magnetic tape, is fixed to the base plate 14.

The first pinch-roller lever 25 is supported by the base plate 14 on its shaft 14h in a freely rotatable fashion, and to the first pinch-roller lever 25, is fixed the first pinch roller 26 in a freely rotatable fashion. The first pinch-roller lever 25 is always urged by a spring, not shown, in a departing direction from the first capstan 27. The first capstan 27 receives a turning force from the motor 11 through an endless belt, not shown, and is allowed to constantly rotate counterclockwise. Accordingly, when the first pinch roller 26 is pressed against the first capstan 27, the first magnetic tape, which is sandwiched in between, is sent toward the reel of the first cassette tape that is engaged by the first take-up reel mount 24.

The first idler lever 28 is supported by the base plate 14 on its shaft 14i in a freely rotatable fashion. To the first idler lever 28, is fixed the first idler gear 29 in a freely rotatable fashion in order to rotate the first take-up reel mount 24. The first idler lever 28, which is always urged counterclockwise by a spring, not shown, has an engaging member 28a at its portion on the direction C side that is provided as a notched and bent member. This engaging member 28a is inserted into the guide hole 23e of the first over-stroke lever 23. When the first over-stroke lever 23 is located on the direction D side, the engaging member 28a is engaged by the blocking section 23g in the guide hole 23e. In this case, the first idler lever 28 is restricted in its rotation counterclockwise, and the first idler gear 29 is not allowed to engage a gear in the first take-up reel mount 24. In contrast, when the first over-stroke lever 23 is located on the direction C side, the engaging member 28a is engaged by the allowable section 23h in the guide hole 23e. In this case, the first idler lever 28 is allowed to rotate counterclockwise with a predetermined angle; thus, the first idler gear 29 is allowed to engage the gear of the first take-up reel mount 24.

Figure 6:
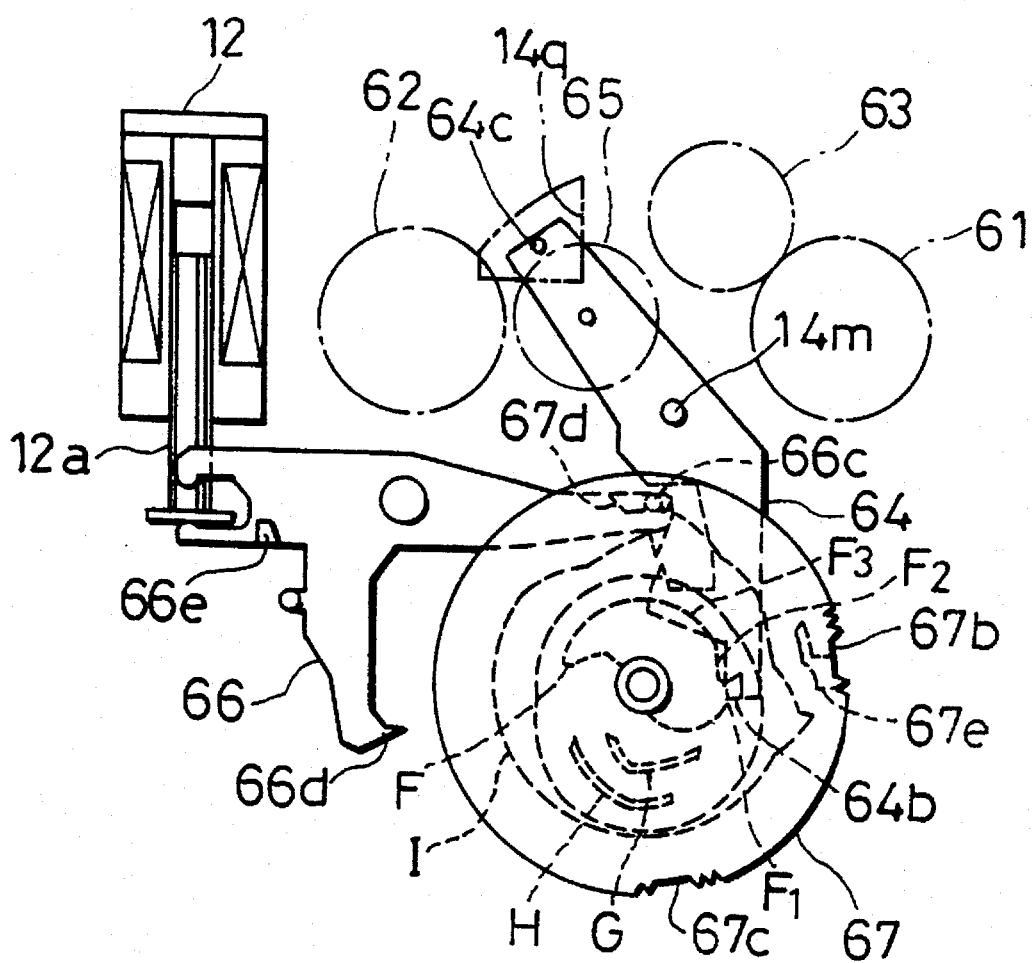
FIG. 6 is a plan view showing a state of an FF/REW driving mechanism in the second-mechanism section in the stopped mode shown in FIG. 1.

The second-mechanism section 50 is provided with: the second head board 51 provided as the third shifting member shown in FIG. 1; the second over-stroke lever 52 provided as the second shifting member; the second over-stroke-lever spring 53 provided as a resilient member and an urging means; a mode lever 54 provided as an operation switching member; the second pinch-roller lever 55 provided as the second pinch-roller supporting member; the second pinch roller 56; the second capstan 57; the second idler lever 58 provided as a shift-blocking member; the second idler gear 59; a spring 60 that constitutes the second pinch-roller supporting member in cooperation with the second pinch-roller lever 55, the second take-up reel mount 61 shown in FIG. 6; the second supply reel mount 62; an FF gear 63; an FF/REW lever 64; an FF/REW gear 65; a solenoid lever 66 that is provided as a stopping lever and that constitutes a stopping means in cooperation with a solenoid 12; a cam gear 67 that is provided as a cam means and that constitutes a driving means in cooperation with the motor 11; a fly gear 68 provided as a cam driving gear; and the solenoid 12.

The second head board 51 has a shape shown in FIG. 8, and receives a magnetic head 73 shown in FIG. 17 on its surface. The second head board 51 has guide holes 51a and 51b at its end portions on the direction C side and on the direction D side, which respectively extend in the directions of arrows C and D. As shown in FIG. 1, the second head board 51 is held on the second over-stroke lever 52, and into its guide holes 51a and 51b, are inserted guide shafts 52a and 52b of the second over-stroke lever 52. Accordingly, the second head board 51 is allowed to shift in the directions of arrows C and D with respect to the second over-stroke lever 52. Further, the second head board 51 has an engaging member 51d at its end portion in the C direction on the direction A side.

The second over-stroke lever 52, which has a shape as shown in FIG. 7, is provided with the guide shafts 52a and 52b that are aligned in the direction C-D, a guide hole 52c that is formed near its end portion on the direction C side and that extends in the direction C-D, and a fixing member 52d that is formed at its end portion on the direction D side with a cutout and bent shape. As shown in FIG. 1, the guide shaft 14f of the base plate 14 is inserted into the guide hole 52c, and the second over-stroke lever 52 is thus shiftable in the direction C-D.

Moreover, the second over-stroke lever 52 is provided with: guide holes 52e and 52f that are located in the vicinity of its center in the direction C-D and that are aligned in the direction A-B with a prolonged form in the direction A-B, guide holes 52g and 52h that are located at its respective side portions on the direction D side and that have prolonged forms in the direction A-B, and an engaging edge 51i that is located in the vicinity of its center in the direction C-D with a protruding form in the direction A. Moreover, the second over-stroke lever 52 has a cam engaging shaft 52m that is positioned in the vicinity of the center and that is engaged by the cam of the cam gear 67, a stopping member 52n that has a downward bent form and is located at a portion on the direction B side, and an engaging member 52o that has a downward bent form and is located at an edge portion in the B direction on the direction C side. The engaging edge 52i has a shape wherein the allowable section 52k, located on the direction D side, is recessed in the direction of arrow B from the blocking section 52j located on the direction C side.

The second over-stroke-lever spring 53 is fixed to the fixing member 52d with its coil section 53b inserted therein. The second over-stroke-lever spring 53 is engaged by the shaft 14g of the base plate 14 at its one end, and is engaged by the stopping edge 51c of the second head board 51 at the other end. Therefore, the second over-stroke lever 52 is always urged in the direction of arrow D by the second over-stroke-lever spring 53.

The mode lever 54, which has a shape that is shown in FIGS. 9(a) through 9(d), is located on the lower side of the second over-stroke lever 52 as shown in FIG. 1. The mode lever 54 has guide shafts 54a and 54b that are aligned in the direction B-A on the upper surface side, has guide members 54c and 54d that are located at its edge portions on both sides on the direction D side with a cut-out and bent upward form, and has an engaging member 54i at the position of one guide member 54d. The guide shafts 54a and 54b are respectively inserted into the guide holes 52e and 52f of the second over-stroke lever 52 and the guide members 54c and 54d are respectively inserted into the guide holes 52g and 52h. Therefore, the mode lever 52 is shiftable in the directions of arrows A and B, and is also shiftable in the directions of arrows C and D, following the movements of the second over-stroke lever 52. Moreover, the mode lever 54 is always urged in the direction of arrow A by a spring, not shown.

The mode lever 54 is shifted to the first through fourth positions at which the guide member 54c is placed at the respective positions shown in FIG. 7, in response to the respective operation modes. These positions correspond to the following modes:

First position: First-mechanism playback mode

Second position: Second-mechanism play back, second-mechanism fast-forward, and second-mechanism rewind modes Third position: Dubbing mode Fourth position: Stop mode Furthermore, the mode lever 54 has an engaging member 54e having a bent down form at the position of the guide member 54d, has a cam engaging shaft 54f that is engaged by the cam gear 67 and that is located between the guide members 54c and 54d, has an opening 54g for allowing the cam engaging shaft 52m of the second over-stroke lever 52 to pass in the direction toward the cam gear 67, and has an engaging member 54h that is located at an edge portion in the B direction on the direction C side. When the mode lever 54 is shifted to the first position that is the farthest position on the direction B side, the engaging member 54e is engaged by the engaging member 58b of the second idler lever 58, thereby allowing the second idler 58 to rotate clockwise.

The second pinch roller lever 55 is supported by the shaft 14j on the base plate 14 in a freely rotatable fashion as shown in FIG. 1, and to the second pinch-roller lever 55 is fixed the second pinch roller 56 in a freely rotatable fashion. The second pinch-roller lever 55 is always urged by a spring, not shown, in a departing direction from the second capstan 57.

The second capstan 57, which receives a rotative force form the motor 11 through an endless belt, not shown, is allowed to constantly rotate counterclockwise. Therefore, when the second pinch roller 56 is pressed onto the second capstan 57, the magnetic tape of the second cassette tape, which is sandwiched in between, is sent toward the reel of the second cassette tape that is engaged by the second take-up reel mount 61.

Figure 10:
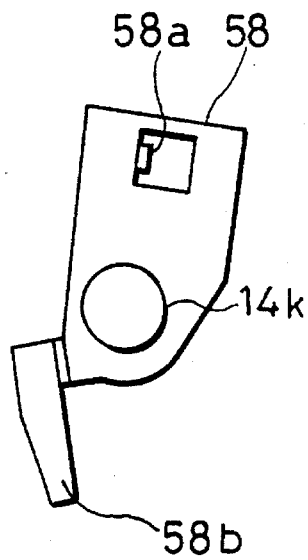
FIG. 10 is a plan view showing the shape of the second idler lever shown in FIG. 1.

The second idler lever 58, which has a shape shown in FIG. 10, is supported by the shaft 14k on the base plate 14 in a freely rotatable fashion. To the second idler lever 58 is fixed in a freely rotatable fashion the second idler gear 59 for rotating the second take-up reel mount 61. The second idler lever 58 is always urged counterclockwise by a spring, not shown. Further, the second idler lever 58 has an engaging member 58a having a cut-out and bent form that is located at its portion on the direction C side, as well as having an engaging member 58b at its end portion on the direction D side.

The engaging member 58a is engaged by the engaging edge 52i of the second over-stroke lever 52. When the second over-stroke lever 52 is positioned on the direction D side, the engaging member 58a is engaged by the blocking section 52j of the engaging edge 52i. In this case, the second idler lever 58 is restricted in its rotation counterclockwise, and the second idler gear 59 is not allowed to engage the gear of the second take-up reel mount 61. The second idler lever 58, on the other hand, is allowed to engage the allowable section 52k of the engaging edge 52i when the second over-stroke lever is positioned on the direction C side. In this case the second idler lever 58 is allowed to rotate counterclockwise with a predetermined angle, and the second idler gear 59 is thus engaged by the gear of the second take-up reel mount 61.

As shown in FIG. 6, the second take-up reel mount 61 is used for taking up the magnetic tape by engaging one of the reels in the second cassette tape, and the second feed reel mount 62 is used for rewinding the magnetic tape by engaging the other reel of the second cassette tape. The FF gear 63 is used for rewinding the second cassette tape at high speeds by engaging the second take-up reel mount 61. These members are installed on the base plate 14.

Figure 11:
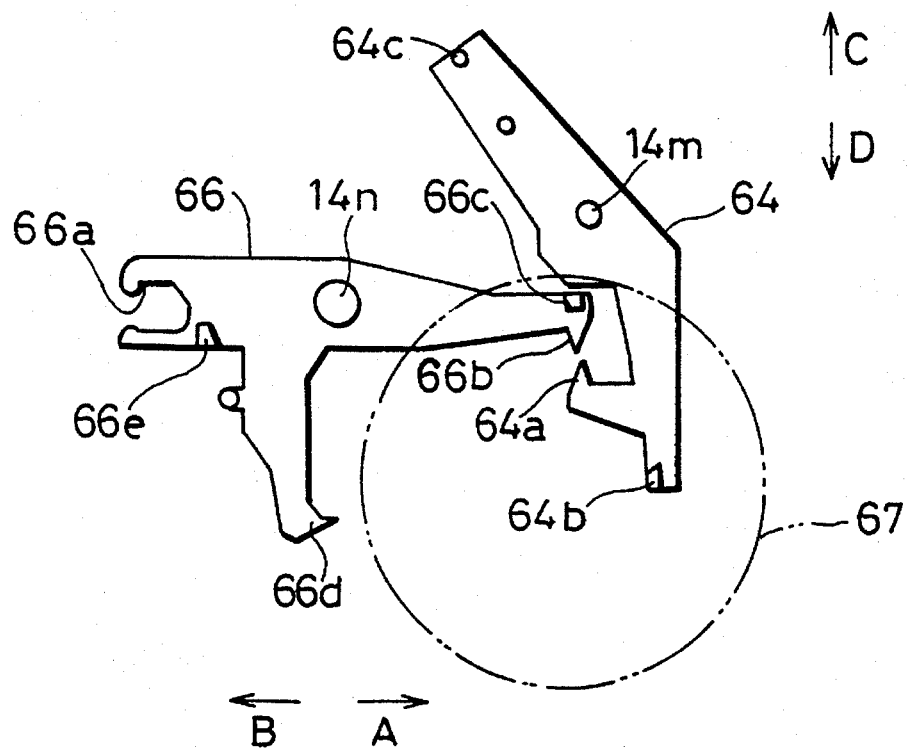
FIG. 11 is a plan view showing the shapes of a solenoid lever and an FF/REW lever in the FF/REW driving mechanism shown in FIG. 6.

The FF/REW lever 64, which has a shape shown in FIG. 11, is fixed to the shaft 14m on the base plate 14 in a pivotal fashion, and is always urged clockwise by a spring, not shown. The FF/REW lever 64 has an engaging claw 64a at its portion on the direction D side that extends in the direction of arrow B, that is, in a direction toward the solenoid lever 66, as well as having an engaging member 64b that is located at its end portion in the D direction and that is engaged by the cam gear 67. As shown in FIG. 6, the FF/REW gear 65 is fixed to the FF/REW lever 64 at its portion on the direction C side, and an engaging pin 64c is located at its end portion in the direction C. The FF/REW gear 65 is designed to carry out rewinding and fast-forward operations of the second cassette tape by engaging the second feed reel mount 62 or the FF gear 63 that stays in mesh with the second take-up reel mount 61. The pivotal movement of the FF/REW lever 64 is carried out by the rotation of the cam gear 67, as will be described later.

The solenoid lever 66, which has a shape shown in FIG. 11, is fixed to the shaft 14n on the base plate 14 in a pivotal fashion. The solenoid lever 66 has a solenoid engaging section 66a that is located at its end portion in the B direction as a virtually U-shaped cut-out section. The solenoid lever 66 also has a stopping member 66e at its portion on the direction A side, as well as having an engaging claw 66b and an engaging member 66c at its end portion in the A direction. Further, the solenoid lever 66 has an engaging claw 66d at the tip of its branched portion extending in the D direction. Moreover, the solenoid lever 66 is always urged counterclockwise by a spring 69 having a virtually L-shape shown in FIG. 1.

As shown in FIG. 1, the solenoid 12 has a movable iron core 12a, a fixed iron core 12b and a coil 12c, and the movable iron core 12a is urged in the direction of arrow D by, for example, a spring, not shown, and when energized, the movable iron core 12a is retracted in the direction of arrow C. The engaging section 12d of the movable iron core 12a is engaged by the solenoid engaging section 66a of the solenoid lever 66.

In general, there are two types of usage in solenoids, that is, attracting and contacting. In the case of attracting, the movable iron core 12a carries out work by being attracted toward the main body of the solenoid 12. In the case of contacting, the movable iron core 12a is completely brought into contact with the main body of the solenoid 12, and maintained thereon, and it is thus allowed to carry out work. In the case of the present solenoid 12, when energized, the movable iron core 21a is attracted by the fixed iron core 21b and collides with the fixed iron core 21b.

Figure 12:
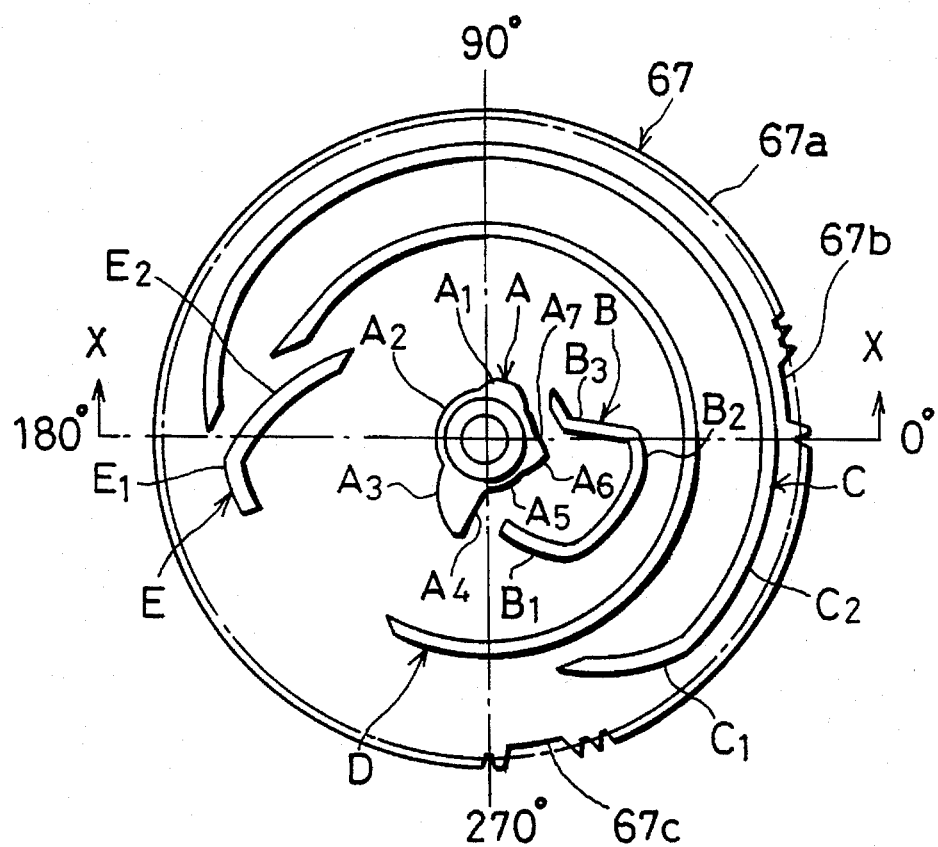
FIG. 12 is a plan view showing the cam gear of FIG. 1.
Figure 13:
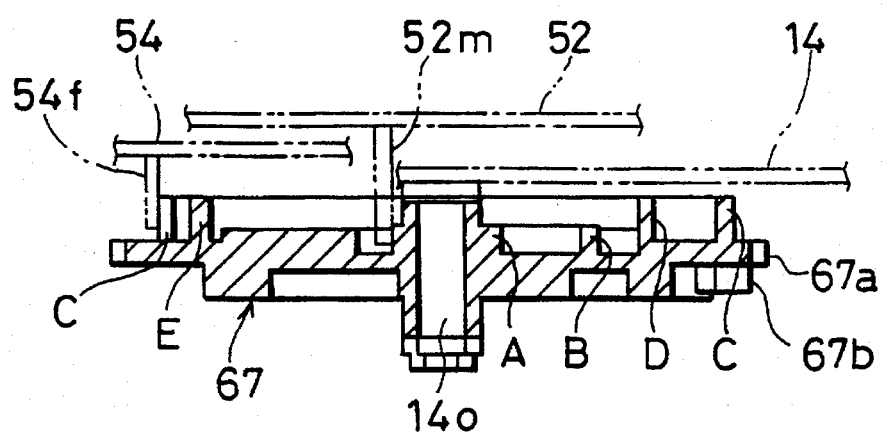
FIG. 13 is a cross-sectional view taken along a line X—X in FIG. 12.
Figure 14:
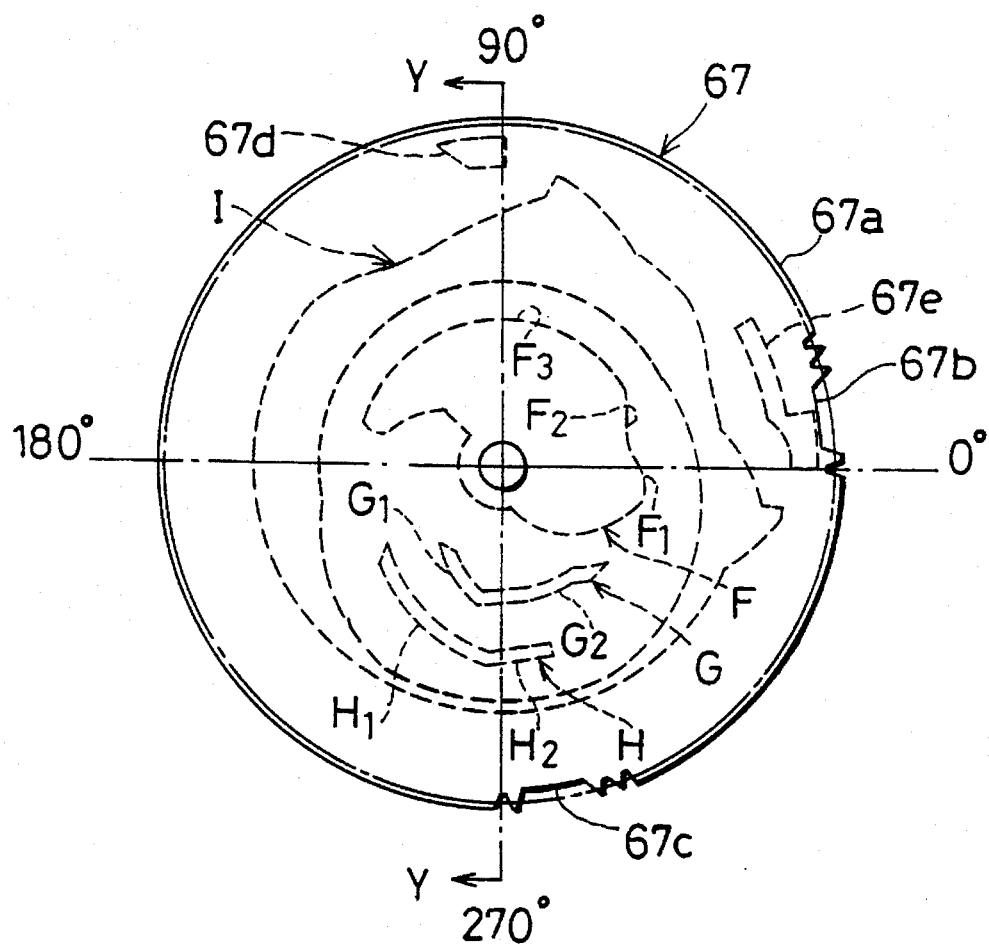
FIG. 14 is a perspective view showing the bottom face of the cam gear, which is seen from the upper-face side.
Figure 15:
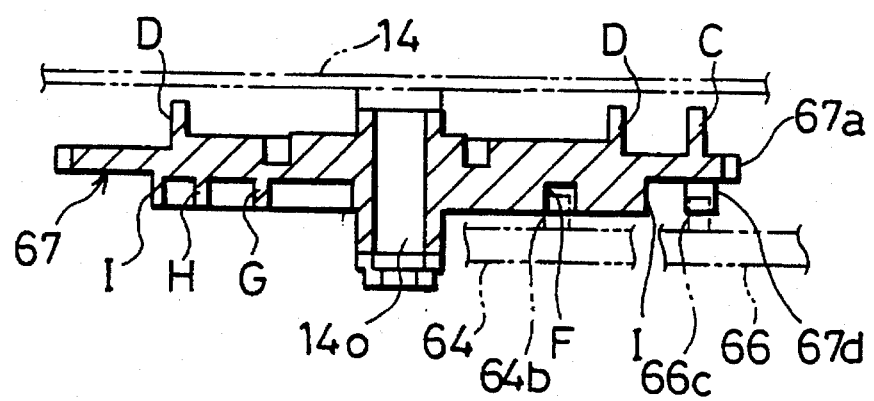
FIG. 15 is a cross-sectional view taken along a line Y—Y in FIG. 14.

The cam gear 67 has a round shape and is provided with various cams on its lower-surface side and upper-surface side, as is shown in FIG. 12 that is a plan view showing the upper-surface side, in FIG. 13 that is a cross-sectional view taken along the line X—X of FIG. 12, in FIG. 14 that is a plan view showing its construction in a perspective manner from the lower-surface side to the upper-surface side, and in FIG. 15 that is a cross-sectional view taken along the line Y—Y of FIG. 14. The cam gear 67 is fixed to the shaft 14o of the base plate 14 in a freely rotatable fashion. Here, in FIG. 12 and FIG. 14, for convenience of explanation, it is supposed to have a set angle in a counterclockwise direction in a state shown in these drawings.

A peripheral gear 67a is formed almost all around the circumferential face of the cam gear 67, and in the peripheral gear 67a, there are two toothless sections 67b and 67c at its portion starting from 0°-position in a counterclockwise direction and at its portion starting from 270°-position in a counterclockwise direction. These toothless sections 67b and 67c allow the cam gear 67 to be released from its engagement with the fly gear 68 shown in FIG. 5 and to be stopped.

As shown in FIGS. 12 and 13, five cams A, B, C, D and E are formed on the upper surface of the cam gear 67. Cams A and B are provided as the first cams, and cams C through E are provided as the second cams. Cam A, which is located in the center, is provided with cam faces $A_1$ through $A_7$. Cam A engages the cam engaging shaft 52m of the second over-stroke lever 52, and thus allows the second over-stroke lever 52 to reciprocally move in the directions of arrows C and D.

Cam B, which is located near one side of cam A, is provided with cam faces $B_1$ through $B_3$. When, upon a reproducing operation or dubbing operation carried out by the first-mechanism section 20 or the second-mechanism section 50, the cam gear 67 has made a rotation of approximately 190°, cam B engages the cam engaging shaft 52m of the second over-stroke lever 52, thereby allowing the second over-stroke lever 52 to move in the direction of arrow C and to be held at the operable position.

Cam C, which is virtually formed along the circumferential edge of the cam gear 67, is provided with cam faces $C_1$ and $C_2$. Cam C is designed so that upon a reproducing operation carried out by the first-mechanism section 20, when the cam gear 67 has made a rotation of approximately 100°, cam C engages the cam engaging shaft 54f of the mode lever 54 to allow the mode lever 54 to move in the direction of arrow B and when the cam gear 67 has made a rotation of 270°, it allows the mode lever 54 to be maintained at the first position shown in FIG. 7.

Cam D is located inside cam C in the radial direction of the cam gear 67. Upon a dubbing operation, when the cam gear 67 has made a rotation of not less than 60°, cam D engages the cam engaging shaft 54f of the mode lever 54, and when the cam gear 67 has made a rotation of 270°, it allows the mode lever 54 to be maintained at the third position shown in FIG. 7.

Cam E, which is located on the side opposite to cam B with respect to cam A, is provided with cam faces $E_1$ and $E_2$. Upon a reproducing operation carried out by the first-mechanism section 20 or the second-mechanism section 50, or during a period from a dubbing operation (at the time of 270°-rotation of the cam gear 67) to a stopped state (at the time of 360°-rotation of the cam gear 67), cam E engages the cam engaging shaft 54f of the mode lever 54 to allow the mode lever 54 to move in the direction of arrow B, and when the cam gear 67 has made a rotation of 360°, it allows the mode lever 54 to be held at the fourth position shown in FIG. 7.

As illustrated in FIGS. 14 and 15, cams F through I and locking members 67d and 67e are formed on the under surface of the cam gear 67. Cam F, which is formed in the center of the cam gear 67, is provided with cam faces $F_1$ through $F_3$. Cam F engages the engaging member 64b of the FF/REW lever 64, and thus allows the FF/REW lever 64 to rotate to the stop station and to the fast-forward operation station through the rotation of the cam gear 67 centered on the shaft 14m.

Cam G, which is formed by the side of cam F, is provided with cam faces $G_1$ and $G_2$. Cam G, which engages the engaging member 64b of the FF/REW lever 64, allows the FF/REW lever 64 to be maintained at the playback operation station at which the FF/REW gear 65, fixed to the FF/REW lever 64, is not engaged by the FF gear 63 and the second feed reel mount 62.

Cam H, which is located outside cam G in the radial direction of the cam gear 67, is provided with cam faces $H_1$ and $H_2$. Cam H, which engages the engaging member 64b of the FF/REW lever 64, allows the FF/REW lever 64 to be maintained at a position where the FF/REW gear 65 is engaged by the FF gear 63. The above-mentioned cams F through H constitute the third cam.

The locking member 67d is formed at a position of 90° as shown in FIG. 14, and the locking member 67e is formed at a position of 0°. These locking members 167d and 67e are engaged by the engaging member 66c of the solenoid lever 66, thereby allowing the cam gear 67 to stop in its rotation at the respective rotated positions. In other words, when the locking member 67d is engaged by the engaging member 66c, the cam gear 67 is maintained at a position shown in FIG. 14, and when the locking member 67e is engaged by the engaging member 66c, it is maintained at a position that is rotated by 270° from the position shown in FIG. 14.

Figure 5:
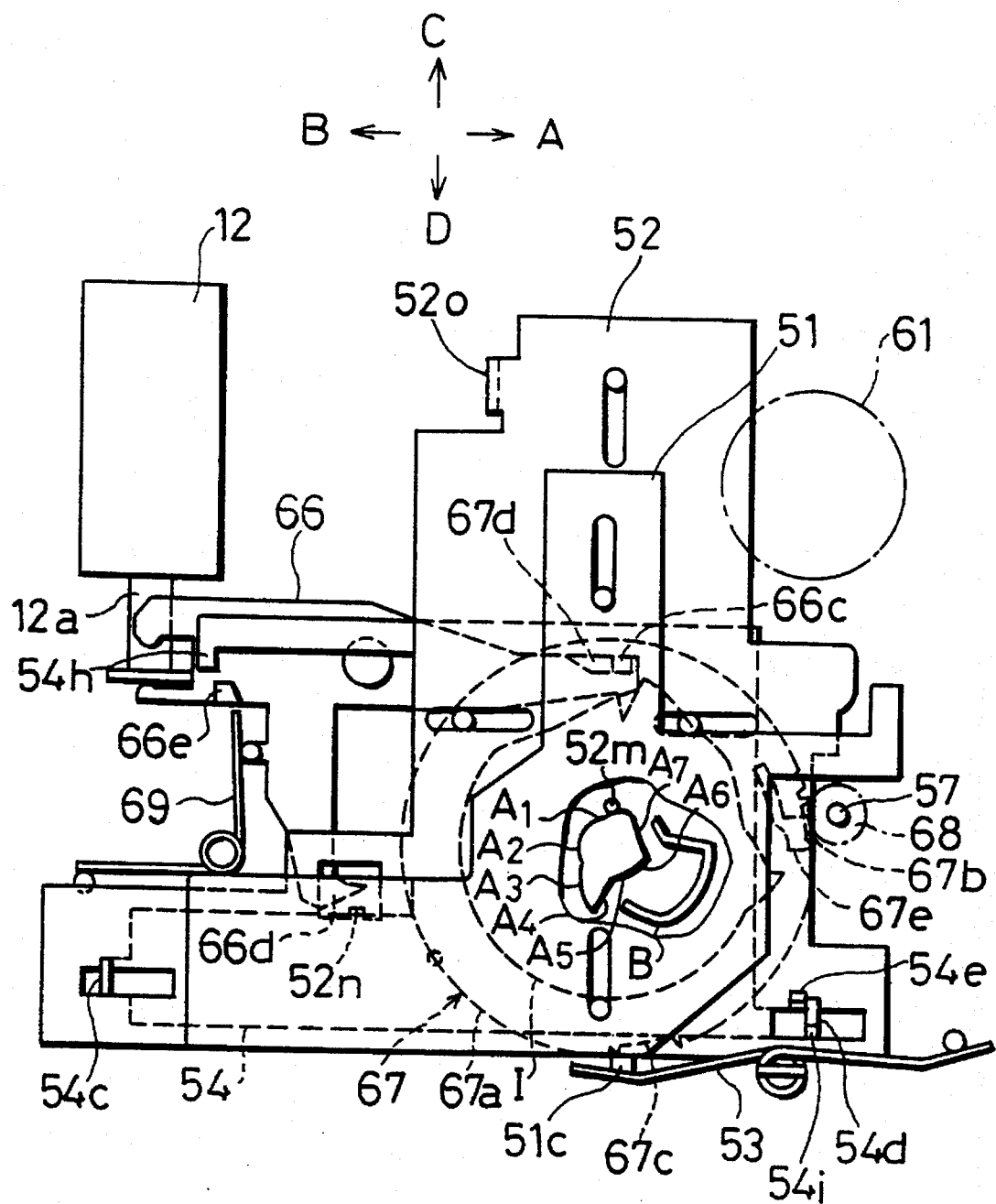
FIG. 5 is a plan view showing a state of the second-mechanism section in the stopped mode shown in FIG. 1.

As illustrated in FIG. 5, the fly gear 68 is installed on the direction A side of the cam gear 67 so that it is allowed to engage the peripheral gear 67a of the cam gear 67. The fly gear 68 always rotates counterclockwise integrally with the second capstan 57.

The cam gear 67, which is allowed to rotate by the engagement with the fly gear 68, is stopped at respective positions where the toothless sections 67b and 67c of the cam gear 67 face the fly gear 68. Here, the rotation of the cam gear 67 in the clockwise direction is inhibited by the engagement between the engaging member 66c of the solenoid lever 66 and the locking members 67d and 67e of the cam gear 67. In order to make the cam gear 67 rotate from this state, the solenoid 12 is energized so as to make the solenoid lever 66 rotate clockwise, thereby releasing the engagement between the engaging member 66c of the solenoid lever 66 and the locking members 67d and 67e of the cam gear 67. However, it is not possible to allow the peripheral gear 67a of the cam gear 67 to engage the fly gear 68 by merely providing this lock-releasing operation. Therefore, the second over-stroke lever 52 gives an urging force in the clockwise direction to the cam gear 67. The following description will discuss how the urging force is applied.

Figure 27:
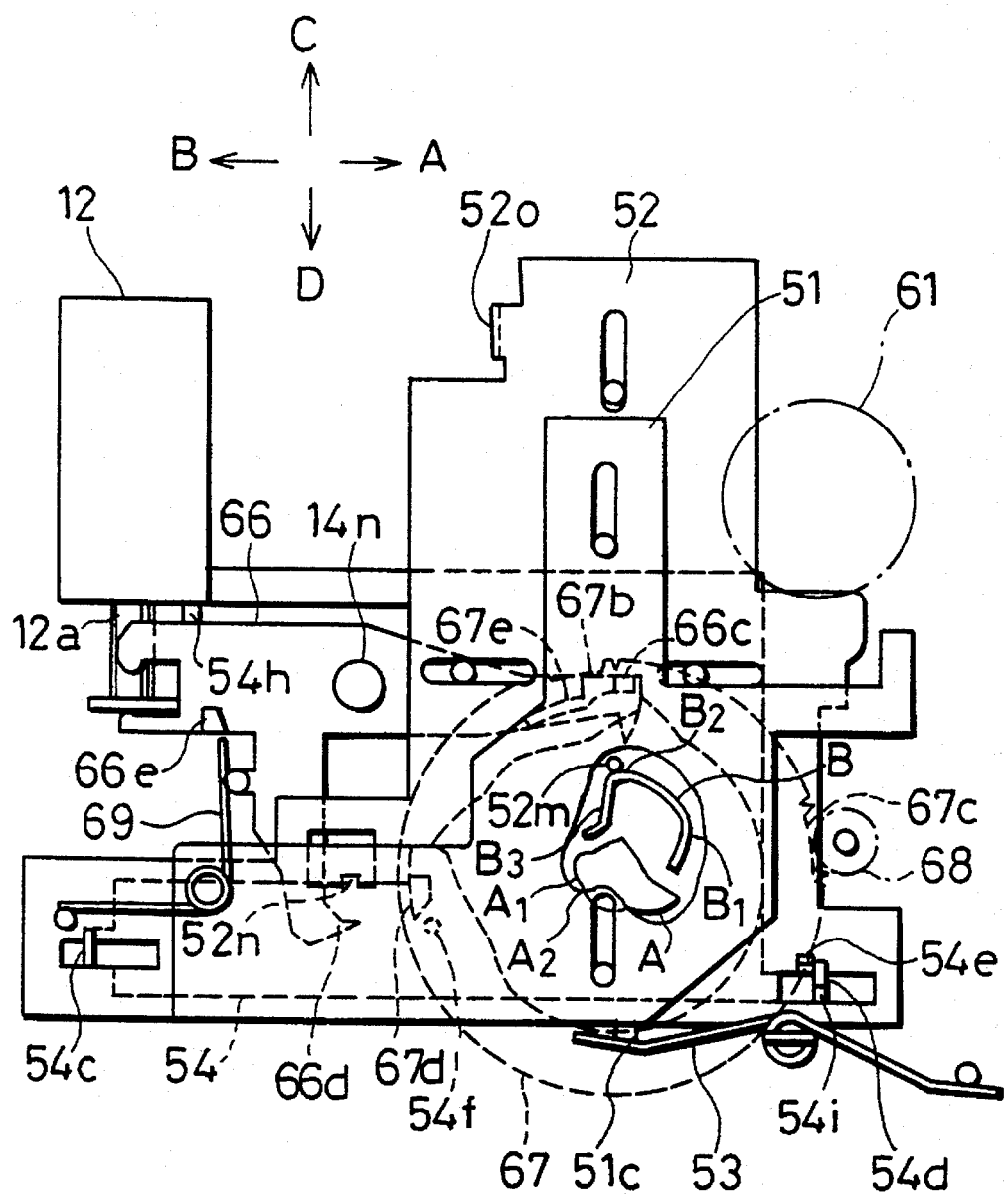
FIG. 27 is a plan view that shows the second-mechanism section of FIG. 5 in the second-mechanism playback mode, or in the dubbing mode.

As illustrated in FIG. 27, during a reproducing operation or a dubbing operation in the second-mechanism section 50, the second over-stroke lever 52 is urged by the second over-stroke-lever spring 53 in the direction of arrow D. Further, the cam engaging shaft 52m of the second over-stroke-lever 52 is pressing cam face $B_2$ of cam B in the cam gear 67. This positional relationship is the same as that in the first-mechanism section 20 during a reproducing operation. In the state shown in FIG. 27, the cam engaging shaft 52m is located on the direction A side in the direction A-B with respect to the rotation center of the cam gear 67. Therefore, the cam gear 67 is subjected to components in the direction of arrow D of urging forces applied by the second over-stroke-lever spring 53 and the cam engaging shaft 52m, which function as a force to rotate the cam gear 67 clockwise. Thus, when the locked state between the engaging member 66c of the solenoid lever 66 and the locking members 67e of the cam gear 67 is released, the cam gear 67 rotates clockwise slightly, thereby allowing the peripheral gear 67a to engage the fly gear 68. Consequently, the cam gear 67, driven by the fly gear 68 thereafter, is allowed to rotate clockwise.

Figure 32:
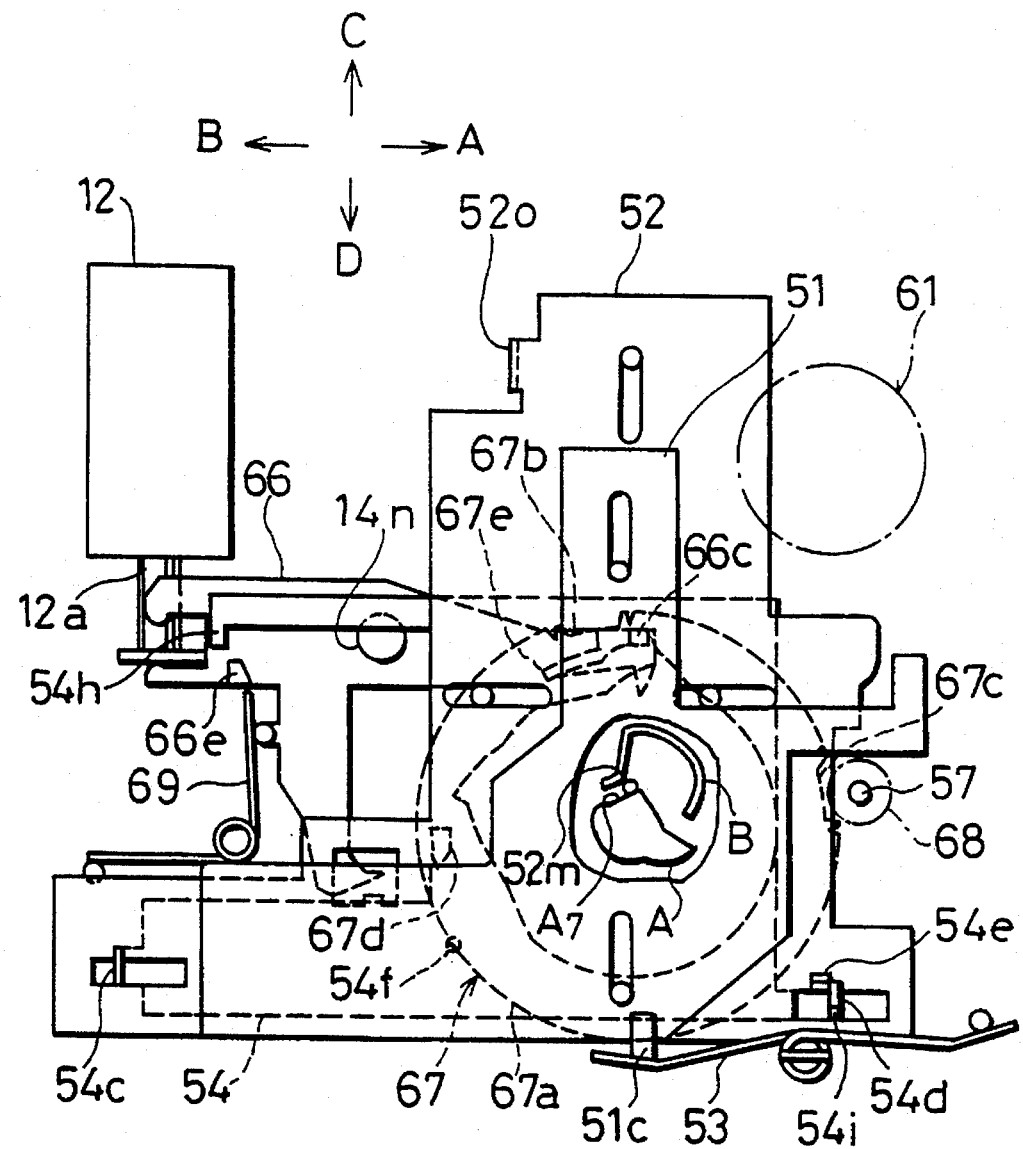
FIG. 32 is a plan view that shows the second-mechanism section of FIG. 5 in the second-mechanism fast-forward mode, or in the rewind mode.

Moreover, as illustrated in FIG. 32, during a fast-forward operation or a rewinding operation in the second-mechanism section 50, the second over-stroke lever 52 is urged by the second over-stroke-lever spring 53 in the direction of arrow D. Further, the cam engaging shaft 52m of the second over-stroke-lever 52 is pressing cam face $A_7$ of cam A in the cam gear 67. Similarly, in the state shown in FIG. 32, the cam engaging shaft 52m is located on the direction A side in the direction A-B with respect to the rotation center of the cam gear 67. Therefore, the cam gear 67 is subjected to a rotative force in the clockwise direction. Consequently, the cam gear 67, driven by the fly gear 68 thereafter, is allowed to rotate clockwise in the same manner.

Furthermore, as illustrated in FIG. 5, upon a stopping operation, the second over-stroke lever 52 is urged by the second over-stroke-lever spring 53 in the direction of arrow D. Further, the cam engaging shaft 52m of the second over-stroke-lever 52 is pressing cam face $A_1$ of cam A in the cam gear 67. Similarly, in the state shown in FIG. 5, the cam engaging shaft 52m is located on the direction A side in the direction A-B with respect to the rotation center of the cam gear 67. Therefore, the cam gear 67 is subjected to a rotative force in the clockwise direction. Consequently, the cam gear 67, driven by the fly gear 68 thereafter, is allowed to rotate clockwise in the same manner.

Next, an explanation will be given on the timing and time of voltages to be applied to the solenoid 12. To the solenoid 12 are applied signals a through f which have voltage waveforms of six types, shown in FIG. 3, that correspond to the respective operation modes. In FIG. 3, the horizontal axis represents the elapsed time and the vertical axis represents the voltage.

A stop signal a, the first-mechanism playback signal b, the second-mechanism playback signal c, a dubbing signal d, the second-mechanism fast-forward signal e, and the second-mechanism rewinding signal f are respectively released when a stop button 4a, the first-mechanism playback button 4b, the second-mechanism playback button 4c, a dubbing button 4d, the second-mechanism fast-forward button 4e, and the second-mechanism rewinding button 4f are operated.

The stop signal a is constituted of only a short pulse, for example, a pulse of 150 msec. The first-mechanism playback signal b is constituted of only a pulse of, for example, 400 msec that rises with a delay from the stop signal a. The second-mechanism playback signal c is constituted of only a short pulse, for example, a pulse of 60 msec, that rises in synchronism with the first-mechanism playback signal b. The dubbing signal d is constituted of only a pulse of, for example, 200 msec that rises in synchronism with the first-mechanism playback signal b. The second-mechanism fast-forward signal e is constituted of the first pulse of, for example, 60 msec that rises in synchronism with the first-mechanism playback signal b and the second pulse of approximately 210 msec that rises after a lapse of 400 msec from the first pulse. The second-mechanism rewinding signal f is constituted of the first pulse of, for example, 60 msec that rises in synchronism with the first-mechanism playback signal b and the second pulse of approximately 400 msec that rises after a lapse of 400 msec from the first pulse.

When the stop button 4a is operated in a certain mode, the stop signal a is instantaneously released. In contrast, when any of the buttons 4b through 4f is operated in order to shift the operation from the stop mode to a desired mode, the corresponding one of the signals b through f is released after a predetermined lapse of, for example, about 200 msec. The purpose of this lapse of time is to maintain a predetermined time for the motor 11 so that it reaches a predetermined rotating speed after the operation has been shifted from the stop mode to the desired mode. Moreover, when any of the buttons 4b through 4f is operated in order to shift the operation from a certain operation mode to another operation mode, the stop signal a for the stop mode is instantly released, and after a predetermined time of, for example, about 350 msec, that is, after completion of the shift to the stop mode, a predetermined signal that corresponds to the operation mode in question is released.

Figure 16A:
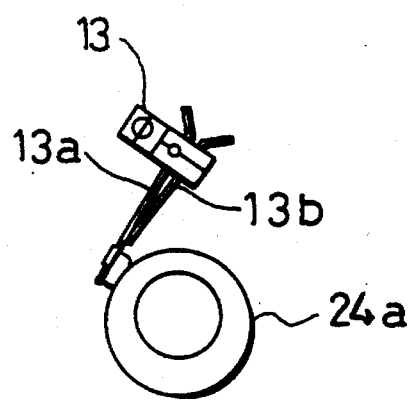
FIG. 16(a) is an explanatory drawing that shows a turning-on operation of a tape-end detecting switch carried out by a rotary cam.
Figure 16B:
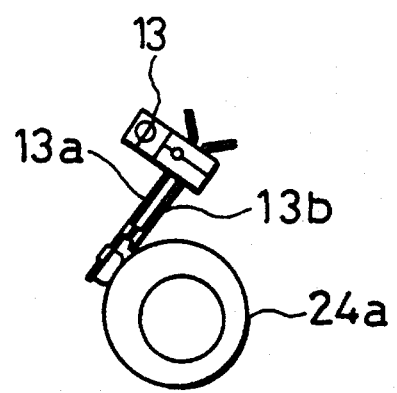
FIG. 16(b) is an explanatory drawing that shows a turning-off operation of the tape-end detecting switch.

Moreover, as illustrated in FIG. 1, the first take-up reel mount 24 is provided with a rotary cam 24a with a round shape. The rotary cam 24a, which is installed at an eccentric position with respect to the rotation center of the first take-up reel mount 24, is allowed to rotate integrally with the first take-up reel mount 24. A tape-end detecting switch 13 is installed at a circumferential portion of the rotary cam 24a. As illustrated in FIGS. 16(a) and 16(b), the tape-end detecting switch 13 has a movable member 13a that contacts the circumferential face of the rotary cam 24a in a sliding manner and a fixed member 13b. When the rotary cam 24a is rotating, that is, the first take-up reel mount 24 is rotating, the movable member 13a is driven by the rotary cam 24a, and makes contacting and separating operations with respect to the fixed member 13b, that is, turning-on and -off operations. FIG. 16(a) shows the turning-on operation and FIG. 16(b) shows the turning-off operation. Pulse signals are generated from these operations, and the signals are inputted to the control circuit 3. In contrast, during the stoppage of the rotary cam 24a, that is, the first take-up reel mount 24, no pulse signal is inputted to the control circuit 3. Therefore, based on the presence or absence of the pulse signals, the control circuit 3 makes a judgement as to whether or not the first cassette tape has been taken up, that is, whether or not the first-mechanism section 20 is in the reproducing state. When the control circuit 3 makes a judgement that the reproducing operation has been completed, it releases the stop signal a.

Moreover, in the present magnetic recording-reproduction apparatus of this type, a cassette tape 72 is inserted into an opened cassette holder 71, for example, as shown in FIG. 17(a), and the cassette tape 72 is loaded in the magnetic recording-reproduction apparatus by closing the cassette holder 71, as shown in FIG. 17(b). Here, FIGS. 17(a) through 17(b) show schematic side views of the second-mechanism section 50, and the magnetic head 73 is allowed to come into contact with the magnetic tape of the cassette holder 71 by shifting the second head mount 51 in the C direction, that is, in the upward direction, from the state shown in FIG. 17(b).

In the above-mentioned arrangement, the following description will discuss the mode-switching operations of the present magnetic recording-reproduction apparatus.

(1) Switching operation from the stop mode to the first-mechanism playback mode.

When the user operates the first-mechanism playback button 4b in the stop mode, a signal corresponding to this button operation is inputted to the control circuit 3. Thus, the control circuit 3 activates the motor 11, and after a lapse of the predetermined time, it supplies the first-mechanism playback signal b to the solenoid 12 through the driving circuit 2.

Figure 18:
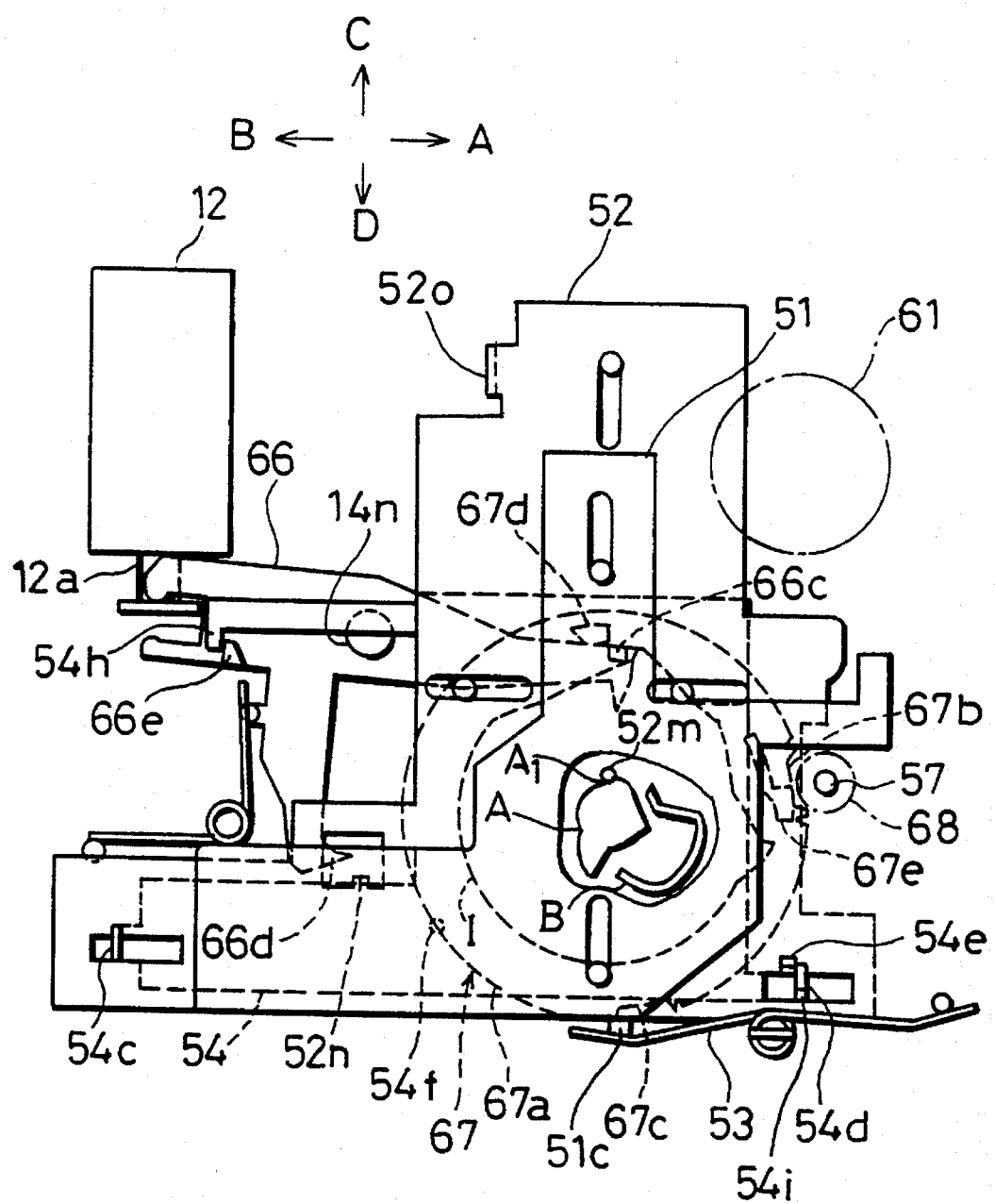
FIG. 18 is a plan view that shows the second-mechanism section in a state where the solenoid carries out an attracting operation in the stopped mode shown in FIG. 5.

As illustrated in FIGS. 5 and 6, in the stop mode, the engaging member 66c of the solenoid lever 66 stays in contact with the locking member 67d of the cam gear 67, and the cam gear 67 is maintained at the corresponding position. Upon receipt of the first-mechanism playback signal b in this state, the solenoid 12 attracts the movable iron core 12a, and the solenoid lever 66 is allowed to rotate clockwise as shown in FIG. 18, thereby releasing the engagement between the engaging member 66c and the locking member 67d. At this time, the engaging member 66c of the solenoid lever 66 comes into contact with cam I in the cam gear 67.

The cam gear 67, released from the locked state, is rotated clockwise by the urging force of the second over-stroke-lever spring 53 and the cam engaging shaft 52m, as described earlier, until it engages the fly gear 68, and is allowed to further rotate clockwise.

Figure 19:
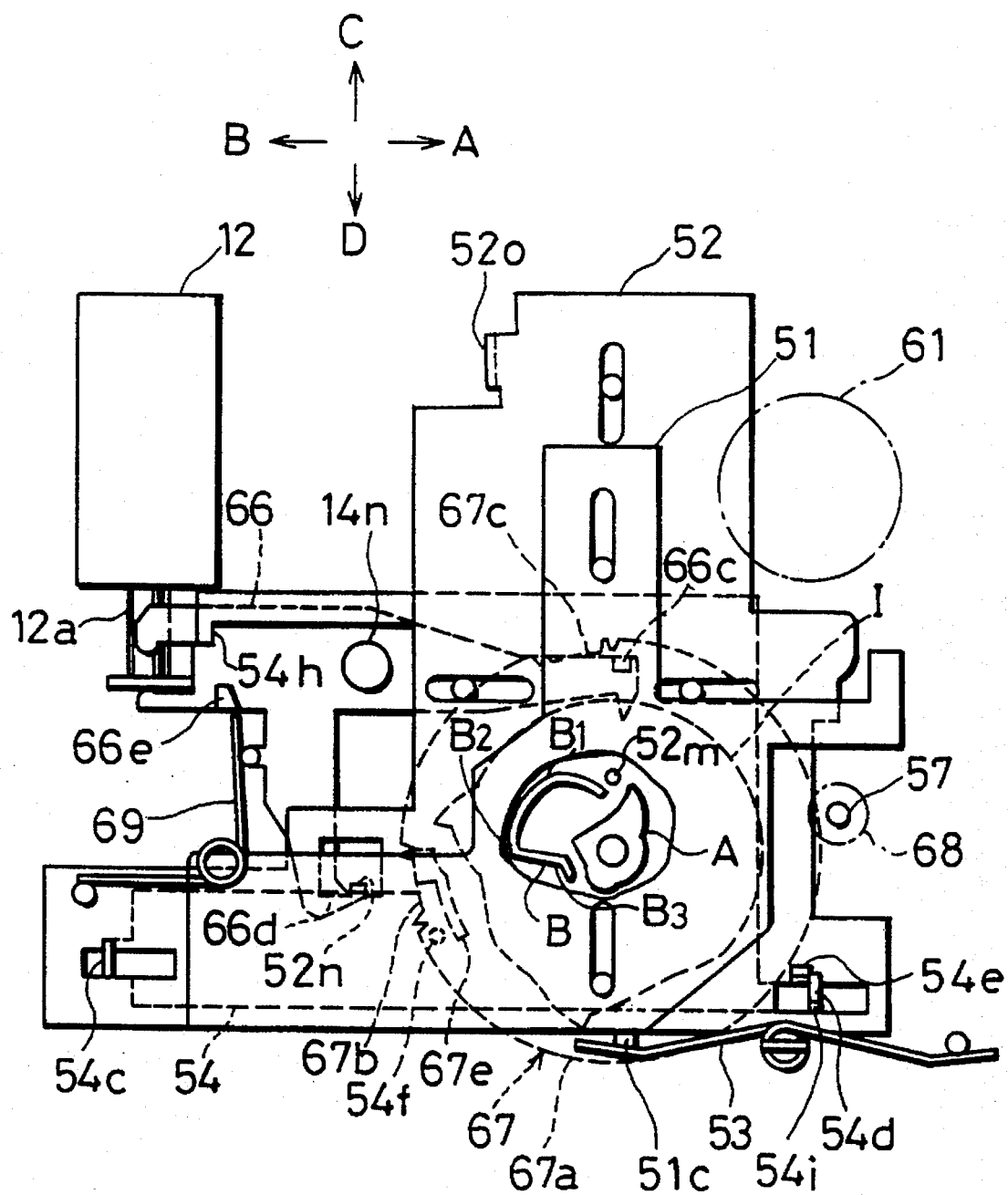
FIG. 19 is a plan view that shows the second-mechanism section in its transient state from the stopped mode shown in FIG. 5 to the first-mechanism playback mode, to the second-mechanism playback mode, or to the dubbing mode.
Figure 20:
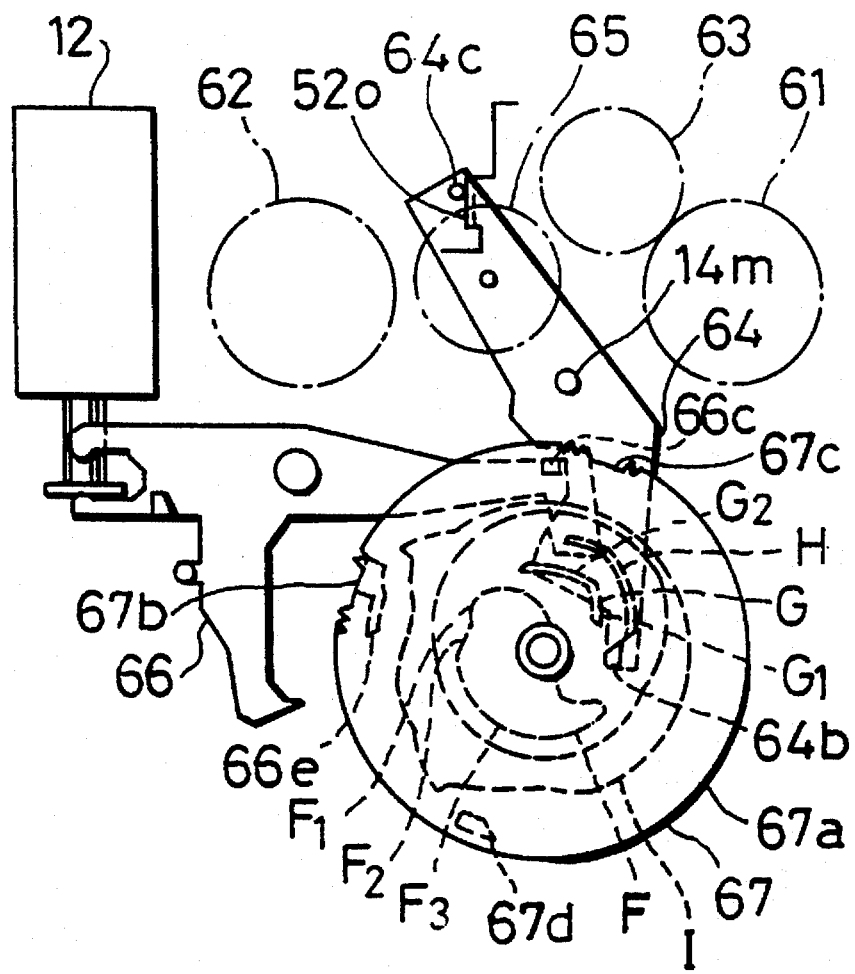
FIG. 20 is a plan view that shows the FF/REW driving mechanism in its transient state from the stopped mode shown in FIG. 6 to the first-mechanism playback mode, to the second-mechanism playback mode, or to the dubbing mode.
Figure 23:
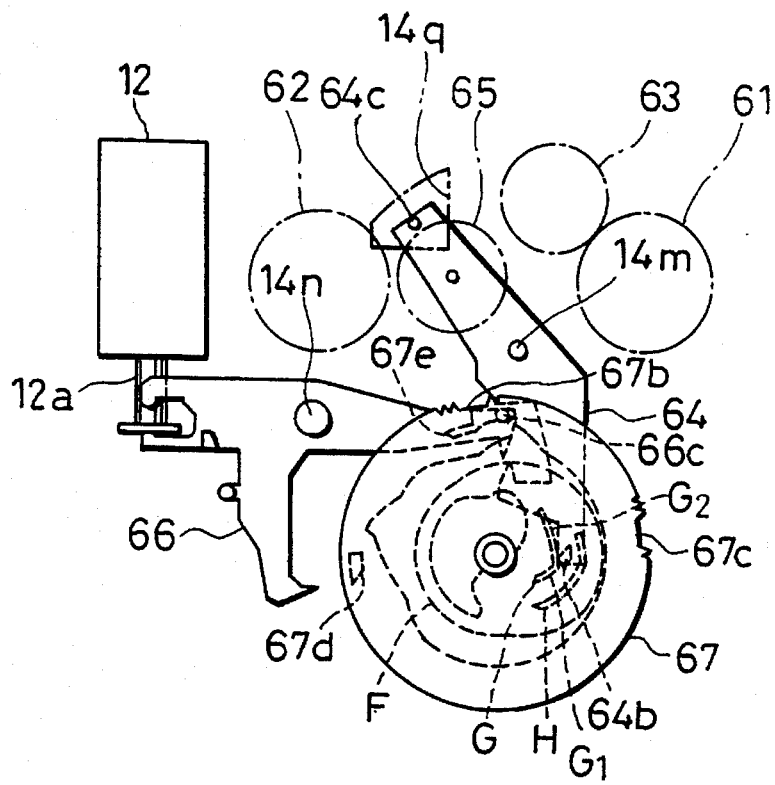
FIG. 23 is a plan view that shows the FF/REW driving mechanism of FIG. 6 in the first-mechanism playback mode, in the second-mechanism playback mode, or in the dubbing mode.

The solenoid 12 is subjected to the cut-off of voltage after passage of the pulse portion of the first-mechanism playback signal b, and its movable iron core 12a is pulled by a spring, not shown, and is returned to its original state. In accordance with this movement, the solenoid lever 66 pivots counter-clockwise, as shown in FIGS. 19 and 20, and allows the engaging member 66c to separate from cam I and to be returned to its original state. Thereafter, the engaging member 66c of the solenoid lever 66 comes into contact with the locking member 67e of the cam gear 67, which has rotated thereto, as shown in FIG. 23; thus, the rotation of the cam gear 67 is stopped.

Figure 4:
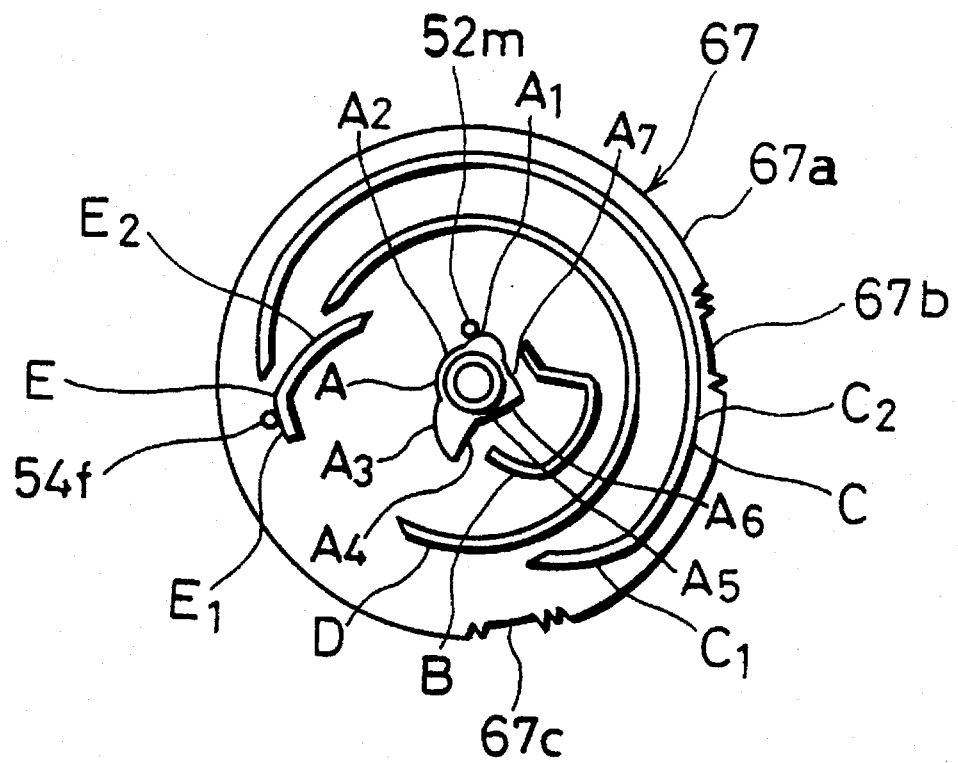
FIG. 4 is an explanatory drawing that shows engaged states between cams of a cam gear and the second overstroke lever as well as between those cams and a cam engaging shaft of a mode lever, in the stopped mode shown in FIG. 1.

Next, an explanation will be given on the operation of the mode lever 54. As illustrated in FIG. 4, the cam engaging shaft 54f of the mode lever 54 stays in mesh with cam face $E_1$ of cam E in the stop mode. Thereafter, as illustrated in FIG. 18, the solenoid lever 66 is driven by the solenoid 12, and is allowed to pivot clockwise. When the cam gear 67 rotates clockwise from its stopped state, the engaging member 66e of the solenoid lever 66 is engaged by the engaging member 54h of the mode lever 54 in such a manner that the mode lever 54 is blocked in its movement in the direction of arrow A. Thus, the cam engaging shaft 54f of the mode lever 54 is maintained at a position where it is allowed to engage cam face $C_1$ of cam C in the cam gear 67. Thereafter, although the solenoid lever 66 is returned to its original state, the cam engaging shaft 54*f* is engaged by cam face C₁ through the rotation of the cam gear 67 in the clockwise direction. Further, when the rotation of the cam gear 67 is stopped upon entering a state shown in FIG. 23, the mode lever 54 has been shifted by the engagement with cam face C₂ to the first position, shown in FIG. 7, which is the farthest position on the direction B side, that is, the position closest to the first-mechanism section 20.

Next, an explanation will be given on the operation of the second over-stroke lever 52. As illustrated in FIG. 4, the cam engaging shaft 52*m* of the second over-stroke lever 52 stays in mesh with cam face A₁ of cam A in the stop mode. When the cam gear 67 rotates clockwise from its stopped state, the cam engaging shaft 52*m* reaches cam face As through cam face A₂ after the mode lever 54 has been shifted to the first position. The position of the cam engaging shaft 52*m* that is allowed by cam face A₃ is a position at which the cam engaging shaft 52*m* is allowed to engage cam B when the cam gear 67 rotates clockwise. Moreover, at this time, the second over-stroke lever 52, pressed by cam face A₃, has been shifted to a position on the direction C side. Thereafter, the cam engaging shaft 52*m* ascends over cam face A₃. Meanwhile, the solenoid lever 66, which has been driven by the solenoid 12 and has been pivoted clockwise, is then returned to its original position by a spring force. At this time, the engaging claw 66*d* is engaged by the stopping member 52*n* of the second over-stroke lever 52, as shown in FIG. 19. Thus, the second over-stroke lever 52 is maintained at a position where its cam engaging shaft 52*m* is allowed to contact cam face B₁ of cam B. Thereafter, the cam engaging shaft 52*m* comes into contact with cam face B₁ of cam B through the rotation of the cam gear 67 so that the cam engaging shaft 52*m* reaches cam face B₂ that is farthest from the center of the cam gear 67 in the direction of arrow C, as shown FIG. 22 and FIG. 27. At this time, the second over-stroke lever 52 has been shifted to the farthest position on the direction C side.

Figure 21:
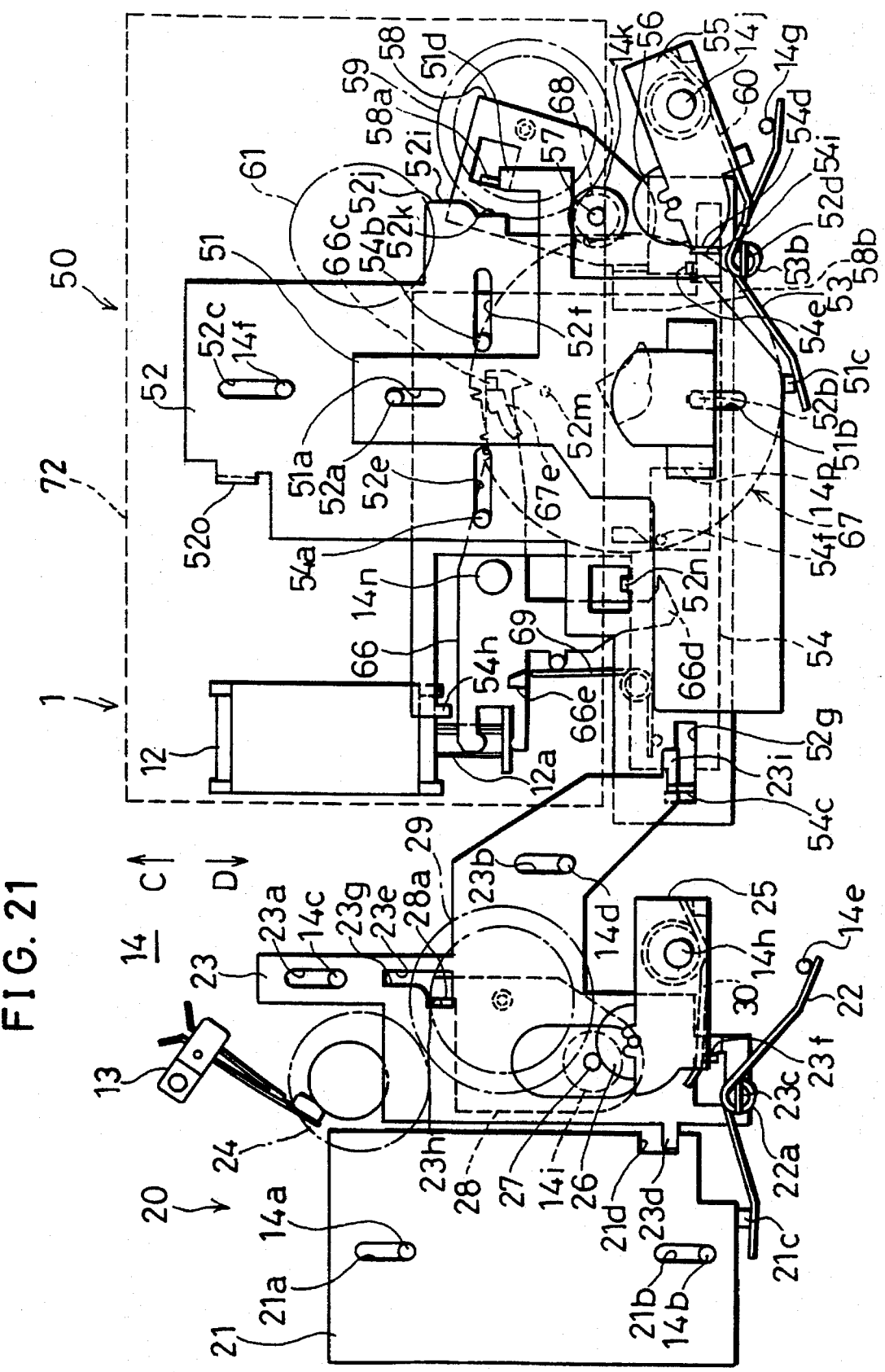
FIG. 21 is a plan view that shows the magnetic recording-reproduction apparatus of FIG. 1 in the first-mechanism playback mode.
Figure 22:
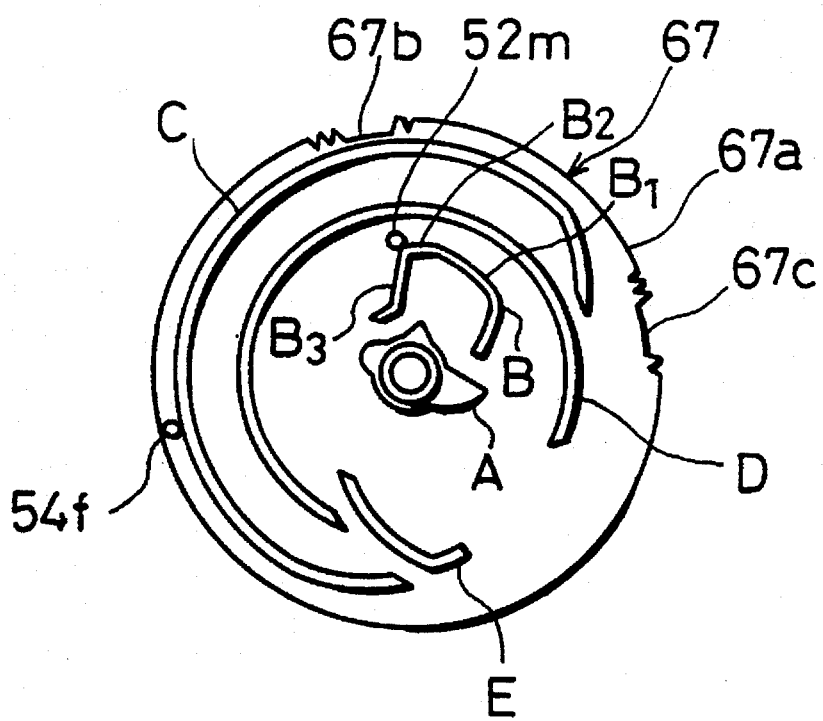
FIG. 22 is an explanatory drawing that shows engaged states between the cams of the cam gear and the second over-stroke lever as well as between those cams and the cam engaging shaft of the mode lever, in the first-mechanism playback mode shown in FIG. 21.

Next, an explanation will be given on the operation of the first over-stroke lever 23. As described earlier, the mode-lever 54 is shifted in the direction of arrow C together with the second over-stroke lever 52, after having been sifted to the position closest to the first-mechanism section 20, that is, to the first position. At this time, the guide member 54*c* of the mode lever 54 is engaged by the engaging member 23*i* of the first over-stroke lever 23; thus, the first over-stroke lever 23 is shifted in the direction of arrow C together with the second over-stroke lever 52, as shown in FIG. 21.

At this time, the first head mount 21 is also shifted in the direction of arrow C together with the first over-stroke lever 23 through the first over-stroke-lever spring 22. This movement is stopped when the edges of the guide holes 21*a* and 21*b* of the first head mount 21 come into contact with the guide pins 14*a* and 14*b* of the base plate 14.

The following description will discuss the operation of the first idler lever 28. The first idler lever 28, which is always urged by a spring, not shown, in the counterclockwise direction, has its engaging member 28*a* engaged by the blocking section 23*g* of the first over-stroke lever 23 in the stop mode, as shown in FIG. 1, thereby being restricted in its rotation in the counterclockwise direction. Therefore, the first idler gear 29 is kept in a state separated from the first take-up reel mount 24. When the first over-stroke lever 23 is shifted in the direction of arrow C as described above, the engaging member 28*a* of the first idler lever 28 is moved to the allowable section 23*h*, as shown in FIG. 21. Thus, the first idler lever 28 is allowed to rotate by a predetermined angle counterclockwise, centered on the shaft 14*i* of the first idler lever 28; consequently, the first idler gear 29 is allowed to engage the first take-up reel mount 24.

The following description will discuss the operation of the first pinch roller lever 25. As illustrated in FIG. 1, in the-stop mode, the first pinch roller lever 25 is always urged in the counterclockwise direction by a spring, not shown. When the over-stroke lever 23 is shifted in the direction of arrow C as described earlier, the engaging member 23*f* of the first over-stroke lever 23 pushes one end portion of the spring 30 in the direction of arrow C. This causes the first pinch-roller lever 25 to pivot clockwise, and the first pinch roller 26 is pressed onto the first capstan 27.

Further, in the second-mechanism section 50, when the mode lever 54 is located at the first position that is closest to the first-mechanism section 20, the second idler lever 58 is allowed to pivot clockwise from its state shown in FIG. 1 to the state shown in FIG. 21, centered on the shaft 14*k*, since its engaging member 58*b* is pressed by the engaging member 54*e* of the mode lever 54. This releases the engagement between the engaging member 58*a* of the second idler lever 58 and the blocking section 52*j* of the second over-stroke lever 52, thereby allowing the second idler gear 59 to separate from the second take-up reel mount 61 with a wide gap.

When the second over-stroke lever 52 is shifted in the direction of arrow C, the second head mount 51 is forced to move in the direction of arrow C integrally with the second over-stroke lever 52 through the second over-stroke spring 53. However, as shown in FIG. 21, this movement is blocked since the engaging member 51*d* of the second head mount 51 is engaged by the engaging member 58*a* of the second idler lever 58 that has pivoted clockwise.

The second head mount 51, when its movement is being blocked, is located at a position shown in FIG. 17(*b*) where the magnetic head 73, installed on the second head mount 51, does not contact the cassette tape 72 held in the cassette holder 71, that is, the second cassette tape, and where in the first-mechanism playback mode, no trouble is caused in loading and removing the second cassette tape in and from the second-mechanism section 50.

Figure 24:
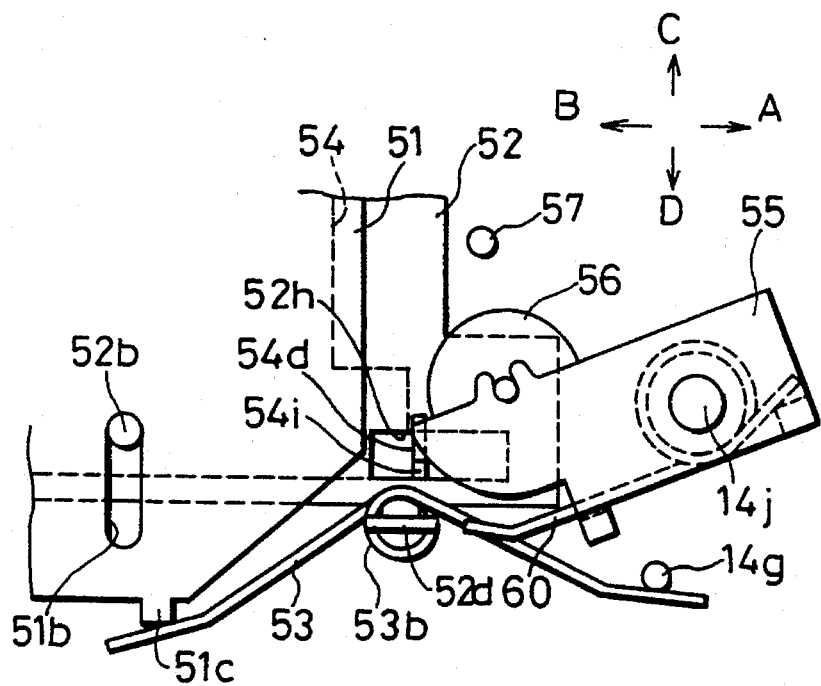
FIG. 24 is a plan view that shows the second pinch roller lever and the vicinity thereof in the case when the mode lever, shown in FIG. 21, is located at the first position.

Moreover, in the state where the mode lever 54 is located at the first position that is the farthest position on the first-mechanism section 20 side, the engaging member 54*i* of the mode lever 54 is not allowed to engage the end portion on the direction B side of the spring 60 that is installed in the second pinch-roller lever 55. Therefore, the second pinch-roller lever 55 is not allowed to pivot clockwise, and maintained at a position apart from the second capstan 57 as shown in FIG. 24. Thus, the first-mechanism section 20 is brought into an operable state for playback, as shown in FIG. 21.

Furthermore, as illustrated in FIG. 6, in the stop mode, the engaging member 64*b* of the FF/REW lever 64 stays in mesh with cam face F₁ of cam F in the cam gear 67. Therefore, the FF/REW gear 65 is maintained at a position apart from the second feed reel mount 62 and the FF gear 63. Thereafter, the engaging member 64*b* of the FF/REW lever 64 is allowed to engage cam faces F₂ and F₃ through the rotation of the cam gear 67. After completion of this engagement, the FF/REW lever 64 pivots clockwise, as shown in FIG. 20, until its engaging pin 64*c* comes to engage the engaging member 52*o* of the second over-stroke lever 52 which is being shifted in the direction of arrow C while keeping its engagement with cam B. Then, as shown in FIG. 23, the engaging member 64*b* of the FF/REW lever 64 is allowed to engage cam face G₁ of cam G, and when the engaging member 64b engages cam face G$_2$, the pivotal movement of the cam gear 67 is stopped. Accordingly, during the reproducing operation of the first-mechanism section 20, the FF/REW gear 65 is maintained at a position apart from the second feed reel mount 62 and the FF gear 63.

(2) Switching operation from the stop mode to the second-mechanism playback mode.

When the user operates the second-mechanism playback button 4c in the stop mode, a signal corresponding to this button operation is inputted to the control circuit 3. Thus, the control circuit 3 activates the motor 11, and after a lapse of the predetermined time, it supplies the second-mechanism playback signal c to the solenoid 12 through the driving circuit 2.

Upon receipt of the second-mechanism playback signal c, the solenoid 12 carries out the attracting operation, and the solenoid lever 66 is allowed to rotate clockwise. This releases the locked state due to the engagement between the engaging member 66c of the solenoid lever 66 and the locking member 67d of the cam gear 67, and the cam gear 67 is rotated clockwise to engage the fly gear 68, and is allowed to further rotate clockwise to a great extent. Meanwhile, the solenoid 12 is returned to its original state, and in accordance with this movement, the solenoid lever 66 rotates counterclockwise. Thereafter, the engaging member 66c of the solenoid lever 66 engages the locking member 67e of the cam gear 67, and the rotation of the cam gear 67 is thus stopped, as shown in FIGS. 23 and 27.

Figure 25:
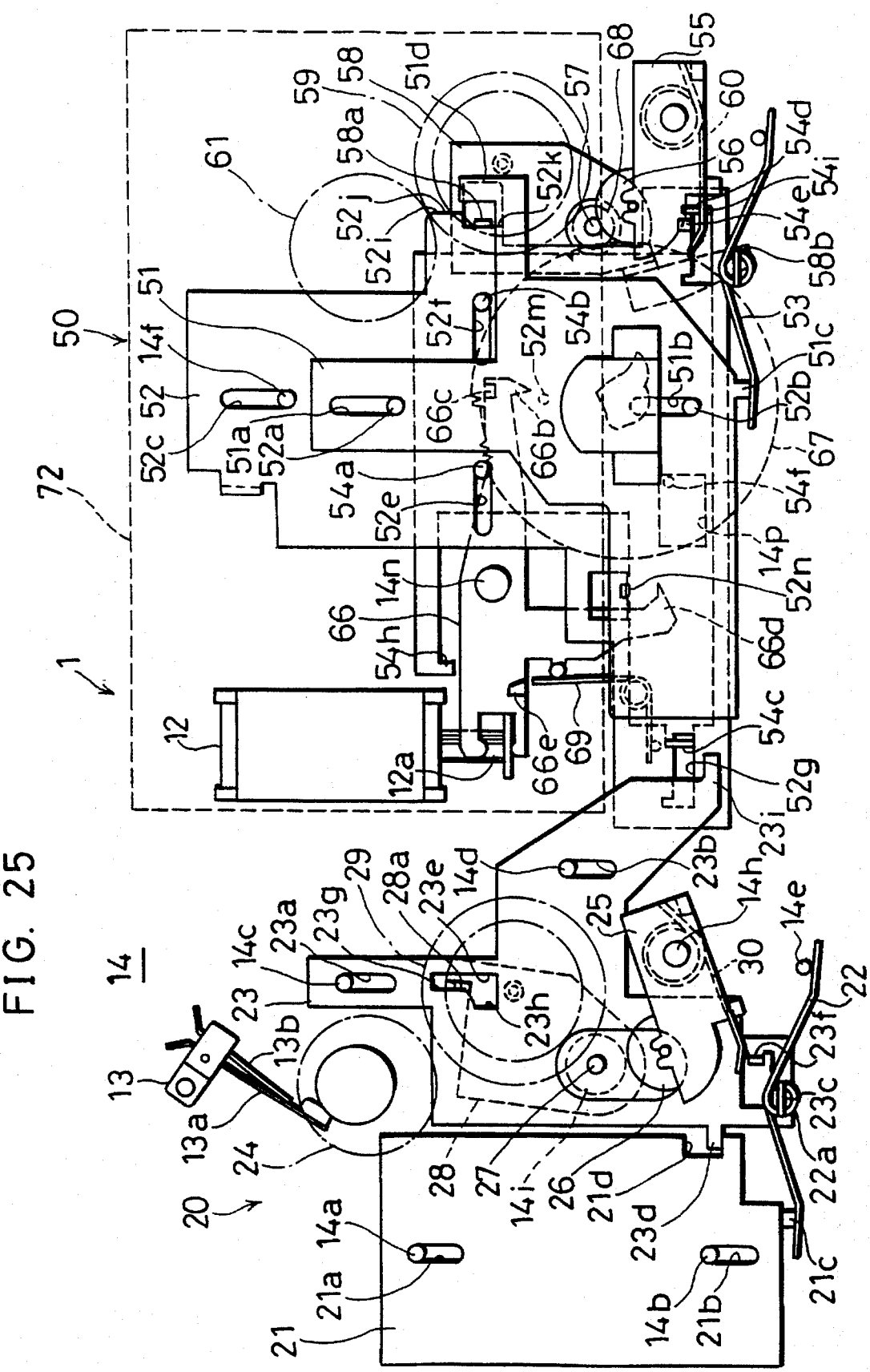
FIG. 25 is a plan view that shows the magnetic recording-reproduction apparatus of FIG. 1 in the second-mechanism playback mode.

Next, an explanation will be given on the operation of the mode lever 54. As illustrated in FIG. 4, the cam engaging shaft 54f of the mode lever 54 stays in mesh with cam face E$_1$ of cam E in the stop mode. Thereafter, when the cam gear 67 starts pivoting, the cam engaging shaft 54f, which has been urged in the direction of arrow A by a spring, not shown, comes into contact with the stopping edge 14p that is formed as an opening in the base plate 14, as shown in FIG. 25, in a manner different from the aforementioned switching operation (1). This movement is provided by the arrangement wherein the pulse width of the second-mechanism playback signal c is shorter than the pulse width of the first-mechanism playback signal b and the solenoid lever 66 returns to its original state before the engaging member 66e of the solenoid lever 66 comes into contact with the engaging member 54h of the mode lever 54. Thus, the mode lever 54 is shifted to the farthest position on the direction A side, and placed at the second position shown in FIG. 7.

Figure 26:
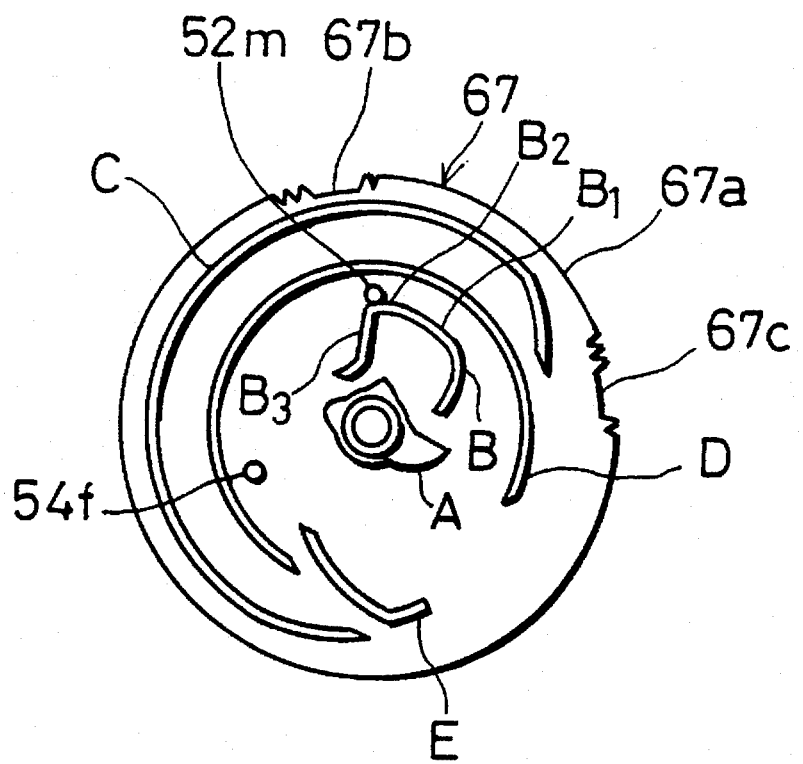
FIG. 26 is an explanatory drawing that shows engaged states between the cams of the cam gear and the second over-stroke lever as well as between those cams and the cam engaging shaft of the mode lever, in the second-mechanism playback mode shown in FIG. 25.

The operation of the second over-stroke lever 52 is the same as that carried out in the aforementioned switching operation (1). In other words, the second over-stroke lever 52 is shifted to the farthest position on the direction C side, as shown in FIG. 25, through the rotation of the cam gear 67. In this case, the cam engaging shaft 52m reaches cam face B$_2$ of cam B in the cam gear 67, and is located thereon, as shown in FIG. 26.

The following description will discuss the operation of the second head mount 51. The second head mount 51 is designed to move in cooperation with the second over-stroke lever 52 through the second over-stroke spring 53. Therefore, during a shifting process from the stop mode to the second-mechanism playback mode, the second head mount 51 is shifted in the direction of arrow C, following the movement of the second over-stroke lever 52 in the direction of arrow C.

The following description will discuss the operation of the second idler lever 58. As illustrated in FIG. 1, in the stop mode, the second idler lever 58 is restricted in its pivotal movement in the counterclockwise direction, since its engaging member 58a is engaged by the blocking section 52j of the second over-stroke lever 52. Therefore, the second idler gear 59 is kept apart from the second take-up reel mount 61. Meanwhile, when the second over-stroke lever 52 is shifted in the direction of arrow C, the engaging member 58a of the second idler lever 58 is allowed to engage the allowable section 52k. Thus, the second idler lever 58 pivots counterclockwise by a predetermined angle, and the second idler gear 59 comes to engage the second take-up reel mount 61.

The following description will discuss the operation of the second pinch roller lever 55. As illustrated in FIG. 1, in the stop mode, the second pinch roller lever 55 is urged in the counterclockwise direction by a spring, not shown, and the second pinch roller 56 is maintained at a position apart from the second capstan 57. Meanwhile, the mode lever 54, after having been sifted to the second position that is the farthest position on the direction A side, is shifted in the direction of arrow C together with the second over-stroke lever 52. Therefore, during this process, the engaging member 54i of the mode lever 54 is allowed to engage the end portion on the direction B side of the spring 60 that is installed in the second pinch-roller lever 55; thus, the second pinch-roller lever 55 pivots clockwise, and is pressed onto the second capstan 57.

Moreover, in the state where the mode lever 54 is located at the second position, the guide member 54c is not allowed to engage the engaging member 23i of the first over-stroke lever 23, as shown in FIG. 7. Therefore, since the first over-stroke lever 23 is not shifted in response to the movement of the mode lever 54 in the direction of arrow C, the first-mechanism section 20 is kept in the stop mode, as shown in FIG. 1.

The operation of the FF/REW lever 64 is the same as that carried out in the aforementioned switching operation (1). In other words, as shown in FIG. 23, the FF/REW lever 64 is maintained at a position where the FF/REW gear 65 is kept apart from the second feed reel mount 62 and the FF gear 63.

(3) Switching operation from the stop mode to the dubbing mode.

When the user operates the dubbing button 4d in the stop mode, a signal corresponding to this button operation is inputted to the control circuit 3. Thus, the control circuit 3 activates the motor 11, and after a lapse of the predetermined time, it supplies the dubbing signal d to the solenoid 12 through the driving circuit 2.

Upon receipt of the dubbing signal d, the solenoid 12 carries out the attracting operation, and the solenoid lever 66 is allowed to rotate clockwise. This releases the locked state due to the engagement between the engaging member 66c of the solenoid lever 66 and the locking member 67d of the cam gear 67, and the cam gear 67 is rotated clockwise to engage the fly gear 68, and is allowed to further rotate clockwise to a great extent. Meanwhile, the solenoid 12 is returned to its original state, and in accordance with this movement, the solenoid lever 66 rotates counterclockwise. Thereafter, the engaging member 66c of the solenoid lever 66 engages the locking member 67e of the cam gear 67, and the rotation of the cam gear 67 is thus stopped, as shown in FIGS. 23 and 27.

Next, an explanation will be given on the operation of the mode lever 54. As illustrated in FIG. 4, the cam engaging shaft 54f of the mode lever 54 stays in mesh with cam face E$_1$ of cam E in the stop mode. Thereafter, as illustrated in FIG. 18, the solenoid lever 66 is driven by the solenoid 12, and is allowed to pivot clockwise. When the cam gear 67 rotates clockwise from its stopped state, the engaging member 66e of the solenoid lever 66 is engaged by the engaging member 54h of the mode lever 54 in such a manner that the mode lever 54 is blocked in its movement in the direction of arrow A.

Figure 30:
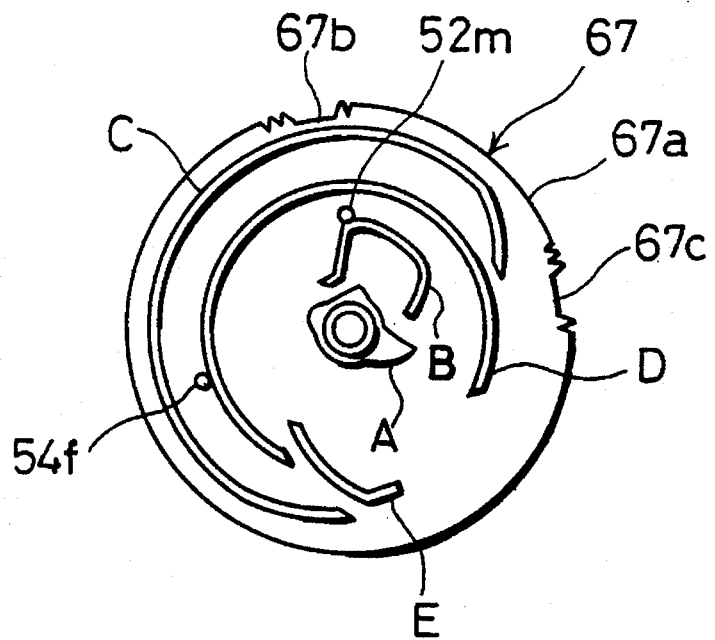
FIG. 30 is an explanatory drawing that shows engaged states between the cams of the cam gear and the second over-stroke lever as well as between those cams and the cam engaging shaft of the mode lever, in the dubbing mode shown in FIG. 29.

Thereafter, when the cam engaging shaft 54f of the mode lever 54 is capable of engaging cam D of the cam gear 67, the power-supplying operation to the solenoid 12, instructed by the dubbing signal d, is completed, and the solenoid 12 and the solenoid lever 66 are returned to its original state. This releases the engagement between the solenoid lever 66 and the mode lever 54, thereby allowing the cam engaging shaft 54f of the mode lever 54 to engage cam D, as shown in FIG. 30. Accordingly, at the time of the stoppage of the cam gear 67 due to the engagement between the locking member 66c of the solenoid lever 66 and the locking member 67e of the cam gear 67, the mode lever 54 is located at the third position, shown in FIG. 7, between the first position and the second position.

Figure 29:
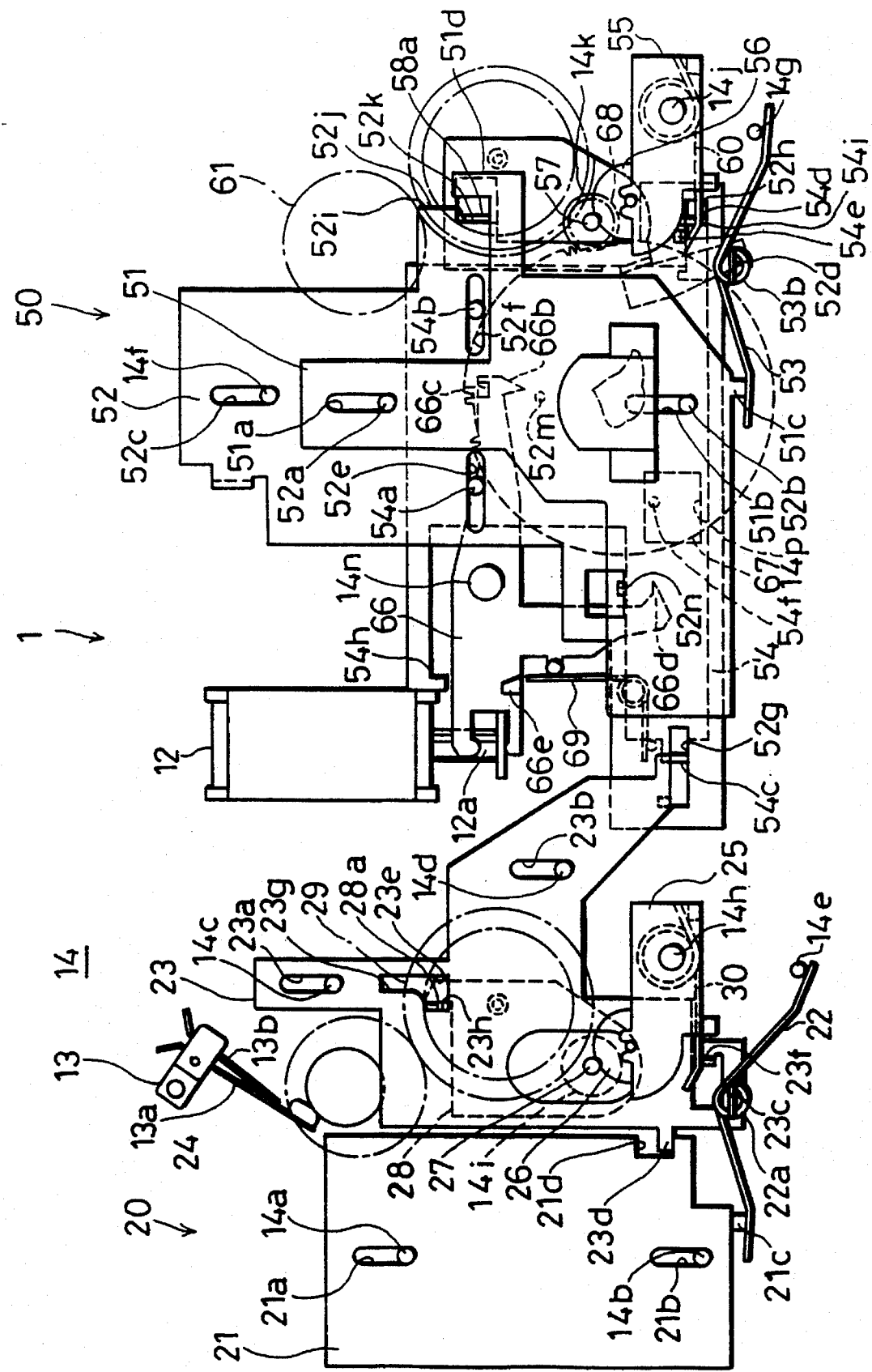
FIG. 29 is a plan view that shows the magnetic recording-reproduction apparatus of FIG. 1 in the dubbing mode.

The operation of the second over-stroke lever 52 is the same as that carried out in the aforementioned switching operation (1). In other words, the second over-stroke lever 52 is shifted to the farthest position on the direction C side, as shown in FIG. 29, through the rotation of the cam gear 67. In this case, the cam engaging shaft 52m reaches cam face $B_3$ of cam B in the cam gear 67, and is located thereon, as shown in FIG. 30.

The following description will discuss the operations of the first over-stroke lever 23 and the first head mount 21. The third position, at which the mode lever 54 is located, makes it possible for the guide member 54c of the mode lever 54 to engage the engaging member 23i of the first over-stroke lever 23. Therefore, as the mode lever 54 is shifted in the direction of arrow C together with the second over-stroke lever 52, the first over-stroke lever 23 is shifted in the direction of arrow C, as shown in FIG. 29, and the first head mount 8 is also shifted in the direction of arrow C through the first over-stroke-lever spring 22. This movement is stopped when the edge portions of the guide holes 21a and 21b in the first head mount 21 come into contact with the guide pins 14a and 14b in the base plate 14.

The operations of the first idler lever 28 and the first pinch-roller lever 25 are the same as those carried out in the aforementioned switching operation (1). In other words, the first idler lever 28 is allowed to rotate counterclockwise by a predetermined angle, and is maintained at a position where the first idler gear 29 is engaged by the first take-up reel mount 24. Further, the first pinch-roller lever 25 pivots clockwise so that the first pinch roller 26 is maintained at a position where it is pressed onto the first capstan 27.

Figure 31:
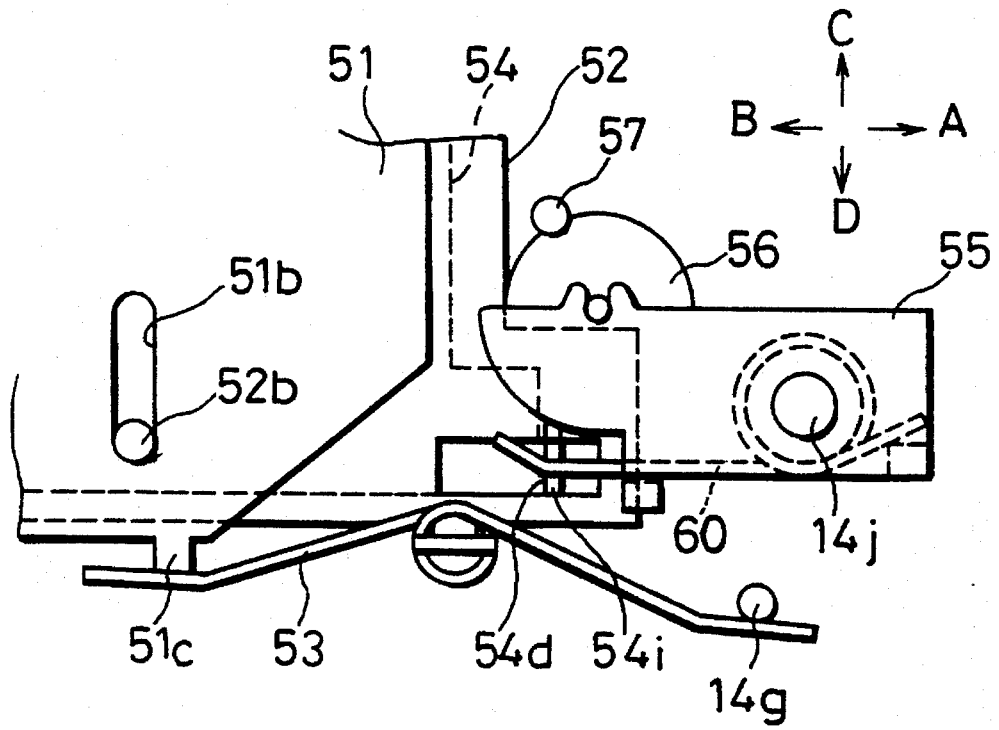
FIG. 31 is a plan view that shows the second pinch roller lever and the vicinity thereof in the case when the mode lever, shown in FIG. 29, is located at the third position.

The following description will discuss the operation of the second pinch-roller lever 55. As illustrated in FIG. 31, the third position of the mode lever 54 allows the engaging member 54i to engage the end portion on the direction B side of the spring 60 that is installed in the second pinch-roller lever 55. Therefore, when the mode lever 54 is shifted to the direction of arrow C together with the second over-stroke lever 52, the second pinch-roller lever 55 pivots clockwise, and the second pinch roller 56 is thus pressed onto the second capstan 57.

Figure 28:
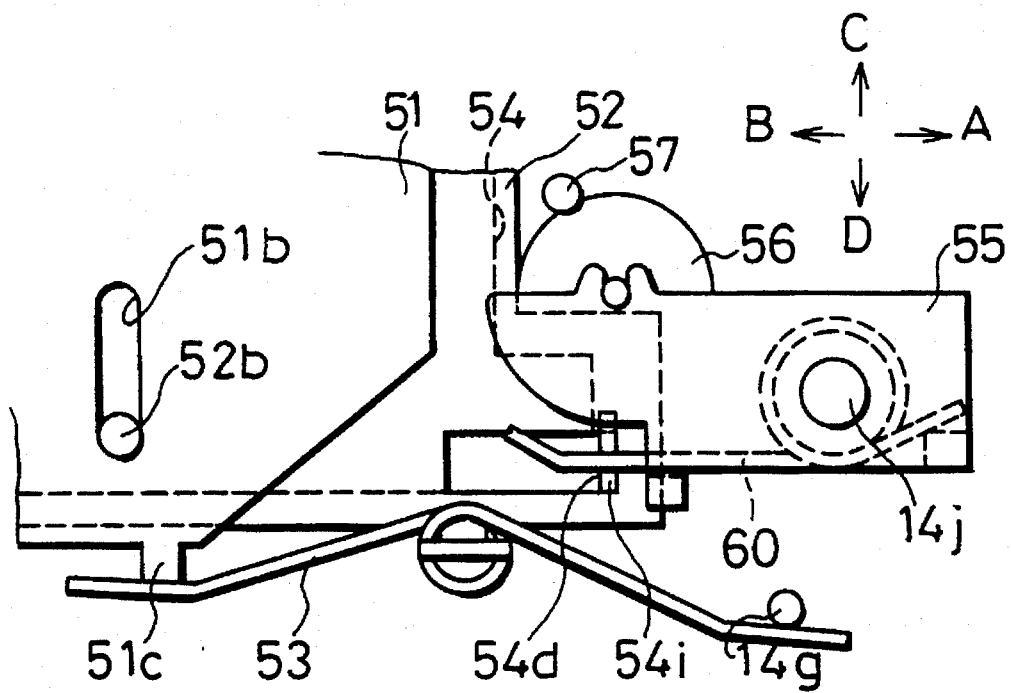
FIG. 28 is a plan view that shows the second pinch roller lever and the vicinity thereof in the case when the mode lever, shown in FIG. 25, is located at the second position.

In the state where the second pinch roller 56 is pressed onto the second capstan 57, the portion of the spring 60 on the direction B side, shown in FIGS. 31 and 28, is kept perpendicular to the shifting direction of the second over-stroke lever 52. In other words, in the states shown in FIGS. 31 and 28, the second pinch roller 56 is pressed onto the second capstan 57 with the same pressing force.

The operations of the second head mount 51 and the second idler lever 58 are the same as those carried out in the aforementioned switching operation (2). In other words, the second head mount 51 is shifted in the direction of arrow C together with the second over-stroke lever 52, and the second idler lever 58 is maintained at a position where the second idler gear 59 is allowed to engage the second take-up reel mount 61.

(4) Switching operation from the stop mode to the second-mechanism fast-forward mode.

When the user operates the second-mechanism fast-forward button 4e in the stop mode, a signal corresponding to this button operation is inputted to the control circuit 3. Thus, the control circuit 3 activates the motor 11, and after a lapse of the predetermined time, it supplies the second-mechanism fast-forward signal e to the solenoid 12 through the driving circuit 2.

Figure 33:
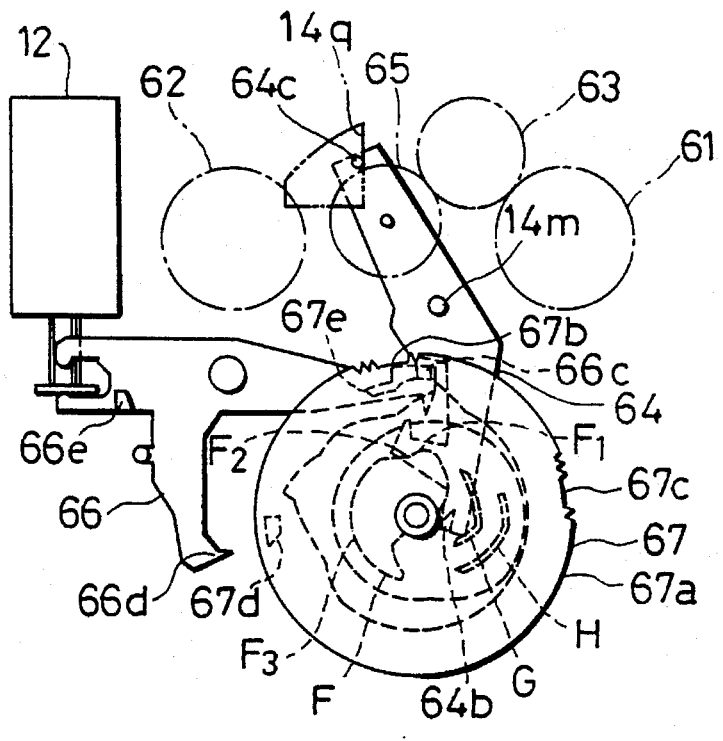
FIG. 33 is a plan view that shows the FF/REW driving mechanism of FIG. 6 in the fast-forward mode.

Upon receipt of the second-mechanism fast-forward signal e, the solenoid 12 carries out the attracting operation, and the solenoid lever 66 is allowed to rotate clockwise. This releases the locked state due to the engagement between the engaging member 66c of the solenoid lever 66 and the locking member 67d of the cam gear 67, and the cam gear 67 is rotated clockwise to engage the fly gear 68, and is allowed to further rotate clockwise to a great extent. Meanwhile, the solenoid 12 is returned to its original state, and in accordance with this movement, the solenoid lever 66 rotates counterclockwise. Thereafter, the engaging member 66c of the solenoid lever 66 engages the locking member 67e of the cam gear 67, and the rotation of the cam gear 67 is thus stopped, as shown in FIGS. 32 and 33.

In addition, since the second-mechanism fast-forward signal e is constituted by the first pulse and the succeeding second pulse as shown in FIG. 3, the solenoid 12 makes the attracting operations twice during the above-mentioned process, and after completion of the second attracting operation, the engaging member 66c and the locking member 67e engage each other.

The operation of the mode lever 54 is the same as that carried out in the aforementioned switching operation (2). In other words, the mode lever 54 is placed at the second position, shown in FIG. 7, that is the farthest position on the direction A side.

The following description will discuss the operation of the second over-stroke lever 52. As illustrated in FIGS. 4 and 5, the engaging shaft 52m of the second over-stroke lever 52 is engaged by cam face $A_1$ of cam A in the cam gear 67 in the stop mode. When the cam gear 67 rotates clockwise from its stopped state, the cam engaging shaft 52m reaches cam face $A_5$ after passing through cam face $A_2$ after the mode lever 54 has been shifted to the second position as described earlier. At the time when the cam engaging shaft 52m is passing through the cam face $A_3$, the solenoid 12 is energized by the second pulse of the second-mechanism fast-forward signal e so that it is allowed to carry out the attracting operation. Thus, since the solenoid lever 66 is allowed to pivot clockwise, the engaging claw 66d of the solenoid lever 66 is not engaged by the stopping member 52n of the second over-stroke lever 52. Therefore, the cam engaging shaft 52m, after having been engaged by cam face $A_3$, is successively engaged by cam faces $A_4$, $A_5$, $A_6$ and $A_7$. Then, in a state where the cam engaging shaft 52m stays in mesh with cam face $A_7$, the cam gear 67 is stopped as described above, and the second over-stroke lever 52 is stopped in its movement.

Moreover, when the mode lever 54 is located at the second position, its guide member 54c is not engaged by the engaging member 23i of the first over-stroke lever 23. Accordingly, in the first-mechanism section 20, the first over-stroke lever 23, the first head mount 21, the first idler lever 28, and the first pinch-roller lever 25 are not operated even if the second over-stroke lever 52, that is, the mode lever 54, is shifted.

The second head mount 51 is shifted integrally with the second over-stroke lever 52, and in the case when the cam engaging shaft 52m is engaged by cam face $A_7$, the second over-stroke lever 52 and the second head mount 51 are located at positions that are slightly moved in the direction of arrow C from those positions in the stop mode. At this position of the second head mount 51, the magnetic head, installed in the second head mount 51, does not contact the magnetic tape of the second cassette tape.

The second idler lever 58 is not allowed to pivot counterclockwise since its engaging member 58a is kept in mesh with the blocking section 52j of the second over-stroke lever 52. Therefore, the second idler gear 59 is maintained apart from the second take-up reel mount 61.

The second pinch-roller lever 55 does not pivot clockwise because the second over-stroke lever 52 is hardly moved in the direction of arrow C and because one end portion of the spring 60 is not pushed in the direction of arrow C by the engaging member 54i of the mode lever 54. Therefore, the second pinch roller 56 is maintained apart from the second capstan 57.

As illustrated in FIG. 6, the FF/REW lever 64 has its engaging member 64b kept in mesh with cam face $F_1$ of cam F in the cam gear 67 in the stop state. Therefore, the FF/REW gear 65 is maintained at a position apart from the second feed reel mount 62 and the FF gear 63. Meanwhile, the engaging member 64b of the FF/REW lever 64 is successively allowed to engage cam face $F_2$ and $F_3$ of cam F through the rotation of the cam gear 67. Thereafter, the FF/REW lever 64 is allowed to pivot clockwise, centered on the shaft 14m, when the engaging member 64b is disengaged from cam face $F_3$, and is stopped when the engaging pin 64 comes into contact with the stopping edge 14q formed at the opening of the base plate 14, as shown in FIG. 33. In this state, the FF/REW gear 65 is engaged by the FF gear 63. Therefore, the second-mechanism section 50 is brought into the operable state for fast-forward.

(5) Switching operation from the stop mode to the second-mechanism rewind mode.

When the user operates the second-mechanism rewind button 4f in the stop mode, a signal corresponding to this button operation is inputted to the control circuit 3. Thus, the control circuit 3 activates the motor 11, and after a lapse of the predetermined time, it supplies the second-mechanism rewind signal f to the solenoid 12 through the driving circuit 2.

Figure 35:
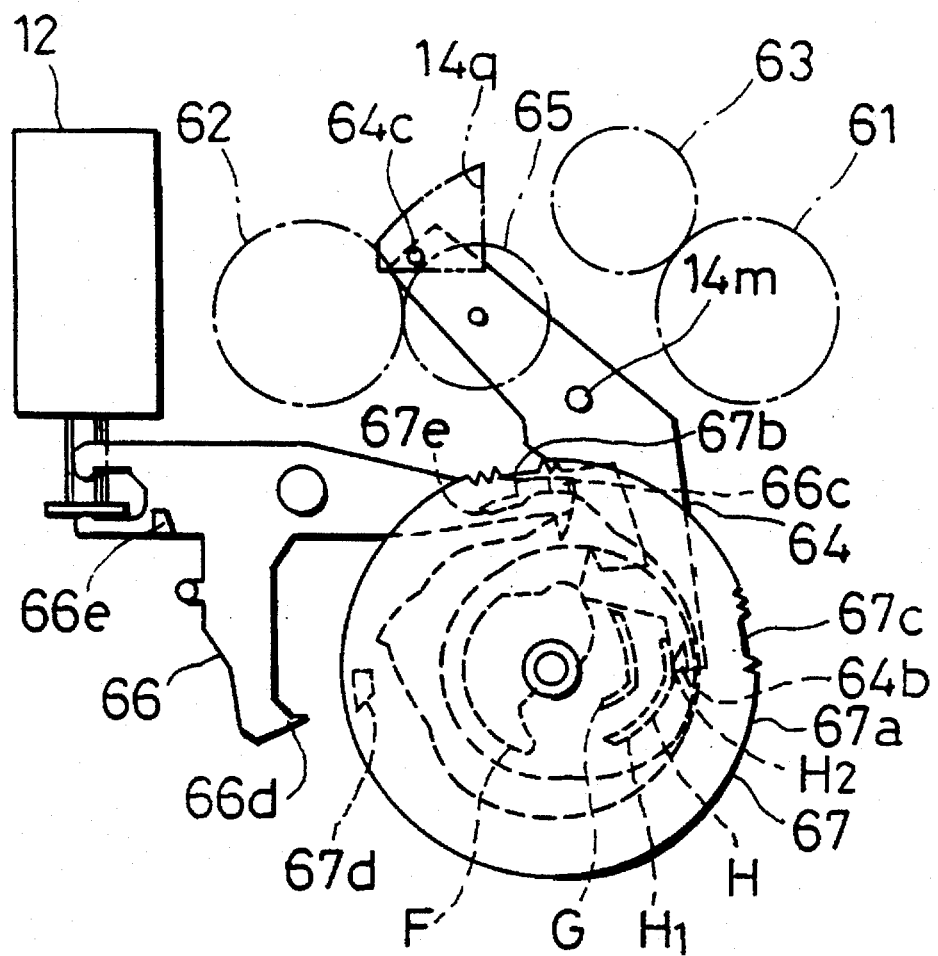
FIG. 35 is a plan view that shows the FF/REW driving mechanism of FIG. 6 in the rewind mode.

Upon receipt of the second-mechanism rewind signal f, the solenoid 12 carries out the attracting operation, and the solenoid lever 66 is allowed to rotate clockwise. This releases the locked state due to the engagement between the engaging member 66c of the solenoid lever 66 and the locking member 67d of the cam gear 67, and the cam gear 67 is rotated clockwise to engage the fly gear 68, and is allowed to further rotate clockwise to a great extent. Meanwhile, the solenoid 12 is returned to its original state, and in accordance with this movement, the solenoid lever 66 also rotates counterclockwise. Thereafter, the engaging member 66c of the solenoid lever 66 engages the locking member 67e of the cam gear 67, and the rotation of the cam gear 67 is thus stopped, as shown in FIG. 35.

In addition, since the second-mechanism rewind signal f is constituted by the first pulse and the succeeding second pulse as shown in FIG. 3, the solenoid 12 makes the attracting operations twice during the above-mentioned process, and after completion of the second attracting operation, the engaging member 66c and the locking member 67e engage each other.

The operations of the mode lever 54 and the over-stroke lever 52 are the same as those carried out in the aforementioned switching operation (4). In other words, the mode lever 54 is placed at the second position, shown in FIG. 7, that is the farthest position on the direction A side. Further, the second over-stroke lever 52 is placed at a position that is slightly moved in the direction of arrow C from the position in the stop mode.

Figure 34:
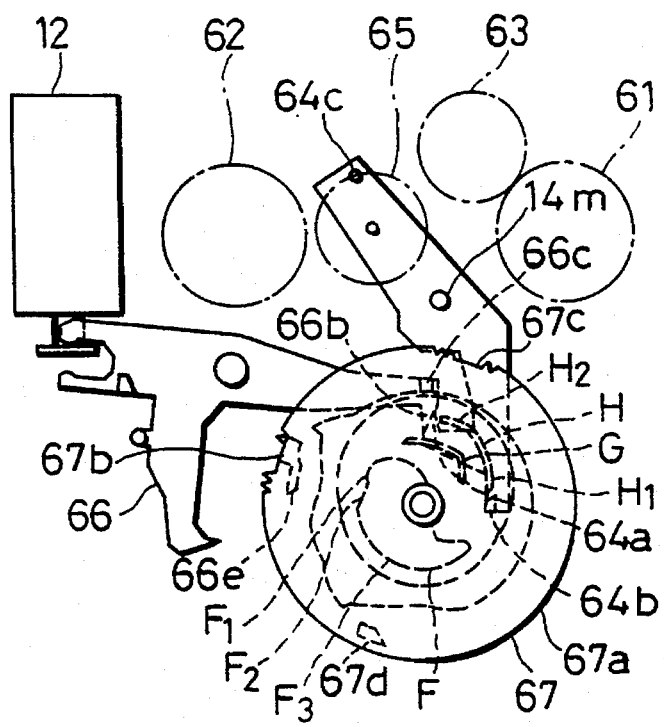
FIG. 34 is a plan view that shows the FF/REW driving mechanism of FIG. 6 in a transient state from the stopped mode to the rewind mode.

As illustrated in FIG. 6, the FF/REW lever 64 has its engaging member 64b kept in mesh with cam face $F_1$ of cam F in the cam gear 67 in the stop state. Therefore, the FF/REW gear 65 is maintained at a position apart from the second feed reel mount 62 and the FF gear 63. Meanwhile, the engaging member 64b of the FF/REW lever 64 is successively allowed to engage cam face $F_2$ and $F_3$ of cam F through the rotation of the cam gear 67. Thereafter, when the cam gear 67 pivots further, the solenoid 12 carries out the attracting operation upon receipt of the second pulse of the second-mechanism rewind signal f, and the solenoid lever 66 is allowed to pivot clockwise. Thus, as illustrated in FIG. 34, the outer edge of the engaging claw 66b of the solenoid lever 66 is engaged by the outer edge of the engaging claw 64a of the FF/REW lever 64, and the clockwise pivotal movement of the FF/REW lever 64 is thus blocked.

Next, the engaging member 64b of the FF/REW lever 64 is engaged by cam face $H_1$ of cam H through the pivotal movement of the cam gear 67, and the solenoid 12 is returned to its original state upon termination of the second-mechanism rewind signal f. Following this process, the solenoid lever 66 is returned to its original state, and the engaging claws 66b and 64a are disengaged from each other.

Thereafter, as illustrated in FIG. 35, the FF/REW lever 64 pivots counterclockwise, centered on the shaft 14m, while its engaging member 64b is successively engaged by cam faces $H_1$ and $H_2$ of cam H. Then, the pivotal movement of the cam gear 67 is stopped as described earlier with its engaging member 64b engaged by cam face $H_2$, and the FF/REW gear 65 is allowed to engage the feed reel mount 28. Therefore, the second-mechanism section 50 is brought into an operable state for rewind.

(6) Switching operation from the first-mechanism playback mode to the stop mode by the use of tape-end detection.

When the control circuit 3 detects the completion of the first-mechanism operable state for playback based on the presence or absence of a pulse signal from the tape-end detection switch 13, it supplies the stop signal a to the solenoid 12 through the driving circuit 2.

As illustrated in FIG. 23, during the first-mechanism operable state for playback, the engaging member 66c of the solenoid lever 66 stays in mesh with the locking member 67e of the cam gear 67, and the cam gear 67 is maintained at the corresponding position.

Upon receipt of the stop signal a, the solenoid 12 carries out the attracting operation, thereby allowing the solenoid lever 66 to pivot clockwise. Thus, the engaging member 66c and the locking member 67e are disengaged from each other, and the cam gear 67 rotates clockwise. While the cam gear 67 rotates, the engaging shaft 52m of the second over-stroke lever 52 successively changes in its engagements from cam face $B_2$ to cam face $B_3$, and further to cam face $A_1$ in the cam gear 67. At this time, since the pulse portion of the stop signal a has already been elapsed, the solenoid 12 and the solenoid lever 66 have been returned to their original states.

Therefore, the engaging member 66c of the solenoid lever 66 engages the locking member 67d of the cam gear 67, thereby stopping the rotation of the cam gear 67.

With the above-mentioned arrangement in which the engagement of the cam engaging shaft 52m is changed from cam face $B_2$ to cam face $A_1$, the second over-stroke lever 52 is allowed to shift in the direction of arrow D to the position of the stop mode, as shown in FIG. 1. Thus, the first over-stroke lever 23, which has been pressed by the guide member 54c of the mode lever 54 in the direction of arrow C, is allowed to shift in the direction of arrow D to the position of the stop mode, together with the first head mount 21.

When the first over-stroke lever 23 is shifted as described above, the first idler lever 28 has its engaging member 28a engaged by the blocking section 23g of the first over-stroke lever 23, and is allowed to pivot clockwise. Therefore, the first idler gear 29 is maintained apart from the first take-up reel mount 24.

The first pinch lever 4 pivots counterclockwise since the pressing force, which has given by the engaging member 23f of the first over-stroke lever 23 onto the spring 30, is released therefrom. Therefore, the first pinch roller 26 is allowed to separate from the first capstan 27.

The cam engaging shaft 54f of the mode lever 54 is disengaged from cam C by the rotation of the cam gear 67, and is engaged by cam face $E_1$ of cam E; thus, the rotation of the cam gear 67 is stopped in this state. Therefore, the mode lever 54 is placed at the fourth position, as shown in FIG. 7.

Additionally, in the magnetic recording-reproduction apparatus of the present embodiment, only the reproducing operation is available in the first-mechanism section 20, that is, with respect to the first cassette tape 1, in order to simplify the construction. However, the present invention is not intended to be limited to this construction; another construction may be adopted wherein both the reproducing and recording operations become available by making the first head mount 21 advance in the C direction. Further, in the second-mechanism section 50, another construction which enables a more independent recording operation by making the second over-stroke lever 52 shift in the direction of arrow C, may be adopted.

As described earlier, the present magnetic recording-reproduction apparatus makes it possible to carry out switchovers among the following operations by using only one cam gear 67: the playback operation for the first-mechanism section 20, the playback operation for the second-mechanism section 50, and the dubbing operation for recording reproduced signals from the first cassette tape on the second cassette tape. Therefore, in the present magnetic recording-reproduction apparatus, it is possible to reduce the number of the driving means, as well as making it possible to reduce the cost of production.

Moreover, the rotatable cam gear 67, which has a plurality of cam faces on one surface and on the other surface thereof, is used as the driving means; this makes it possible to simplify the driving means.

For example, the cam gear 67 has a cam face that engages the second over-stroke lever 52 and drives it and another cam face that engages the mode lever 54 and drives it on its one surface, and the cam gear 67 is rotatively driven; therefore, the present magnetic recording-reproduction apparatus makes it possible to drive the second over-stroke lever 52 and the mode lever 54 by using a simple construction.

In other words, the first-mechanism section 20 for driving the first cassette and the second-mechanism section 50 for driving the second cassette are driven individually as well as simultaneously; this becomes possible by driving the mode lever 54 and the second over-stroke lever 52 in a sequential fashion. And this driving operation is achieved by the present apparatus having a very simple construction wherein one rotatable cam gear is provided as the driving means.

Moreover, in the present magnetic recording-reproduction apparatus, the second idler lever 58 also has a function as a shift-blocking member for blocking the movement of the second head mount 51 in the C direction; this makes it possible to reduce the number of parts and further simplify the construction.

Furthermore, in the present magnetic recording-reproduction apparatus, the first over-stroke lever 23 also has a function for pressing the first pinch roller 26 onto the first capstan 27, and the mode lever 54 also has a function for pressing the second pinch roller 56 onto the second capstan 57; this makes it possible to reduce the number of parts and further simplify the construction.

Moreover, in the present magnetic recording-reproduction apparatus, the second pinch roller 56, when pressed by the mode lever 54 onto the second capstan 57, is placed at the same position both in the case of the mode lever 54 at the second position and in the case of the mode lever 54 at the third position. Therefore, during a recording operation or a reproducing operation as well as during a dubbing operation with respect to the second cassette tape, the pressing force, exerted by the second pinch roller 56 so as to press the second capstan 57 onto the magnetic tape in the second cassette tape, is kept virtually the same. Therefore, during the above-mentioned operations, it is possible to stabilize the travelling state of the second cassette tape.

Furthermore, in the present double-cassette-type magnetic recording-reproduction apparatus, it is possible to make a switch from the double-cassette-type magnetic recording-reproduction apparatus to the single-cassette-type magnetic recording-reproduction apparatus consisting of only the second-mechanism section 50 by removing the first-mechanism section 20 from the tape transport mechanism 1. Therefore, in the case when the single-cassette-type magnetic recording-reproduction apparatus is required, it is possible to easily obtain the single-cassette-type magnetic recording-reproduction apparatus without the necessity of developing it in a separated manner.

Figure 36:
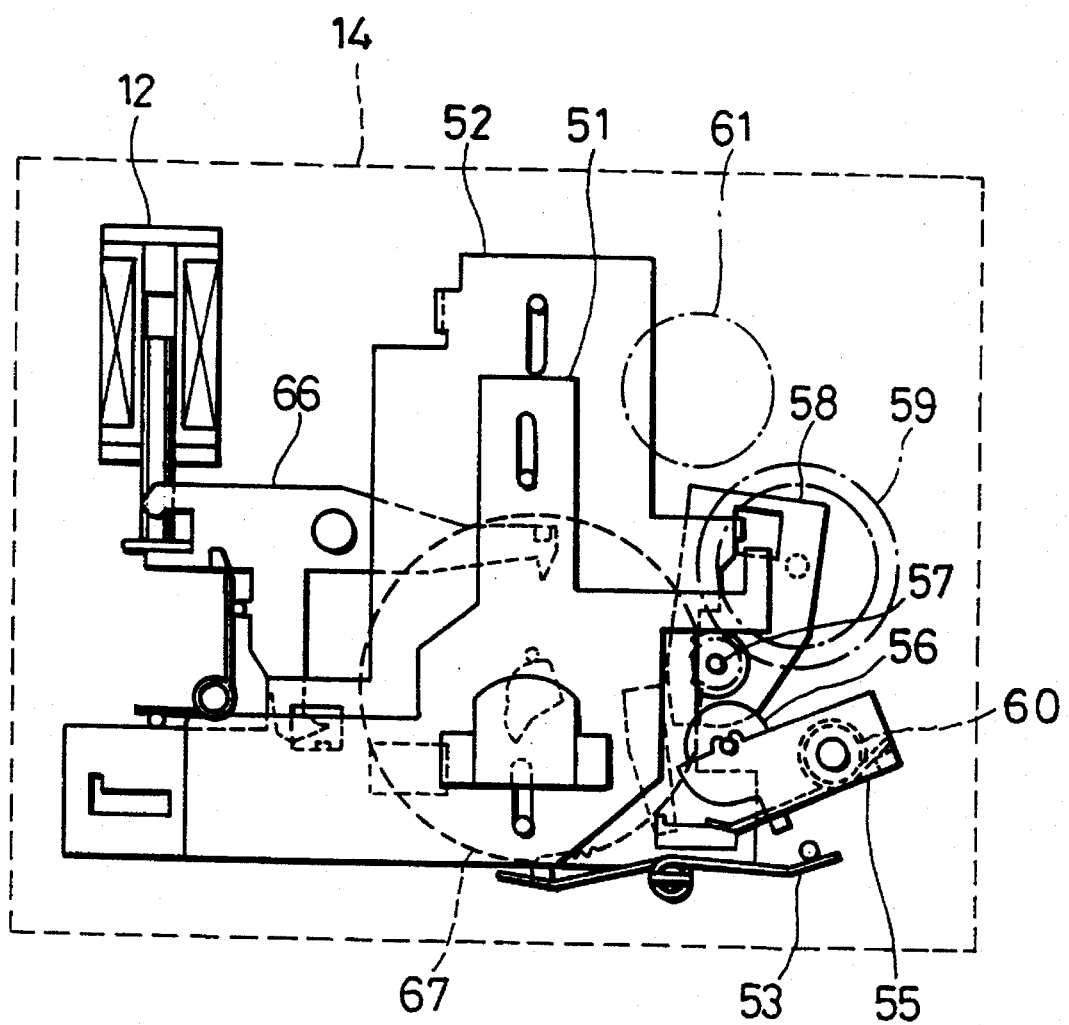
FIG. 36 is a plan view showing a modified structure wherein the first-mechanism section is removed from the structure shown in FIG. 1 and only the second-mechanism section is left.
Figure 37:
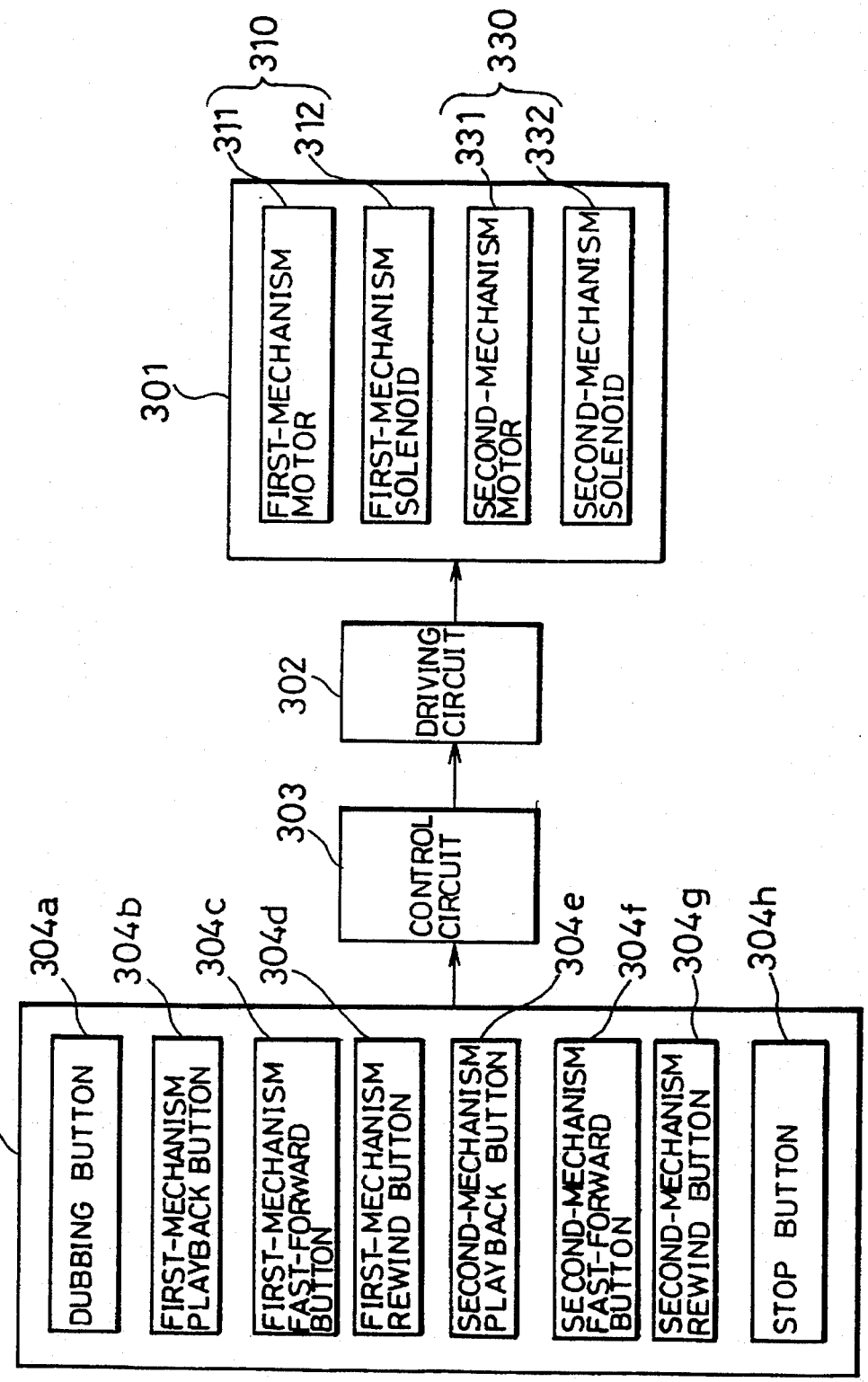
FIG. 37 is a schematic block diagram showing an entire structure of a conventional double-cassette-type magnetic recording-reproduction apparatus.
Figure 38:
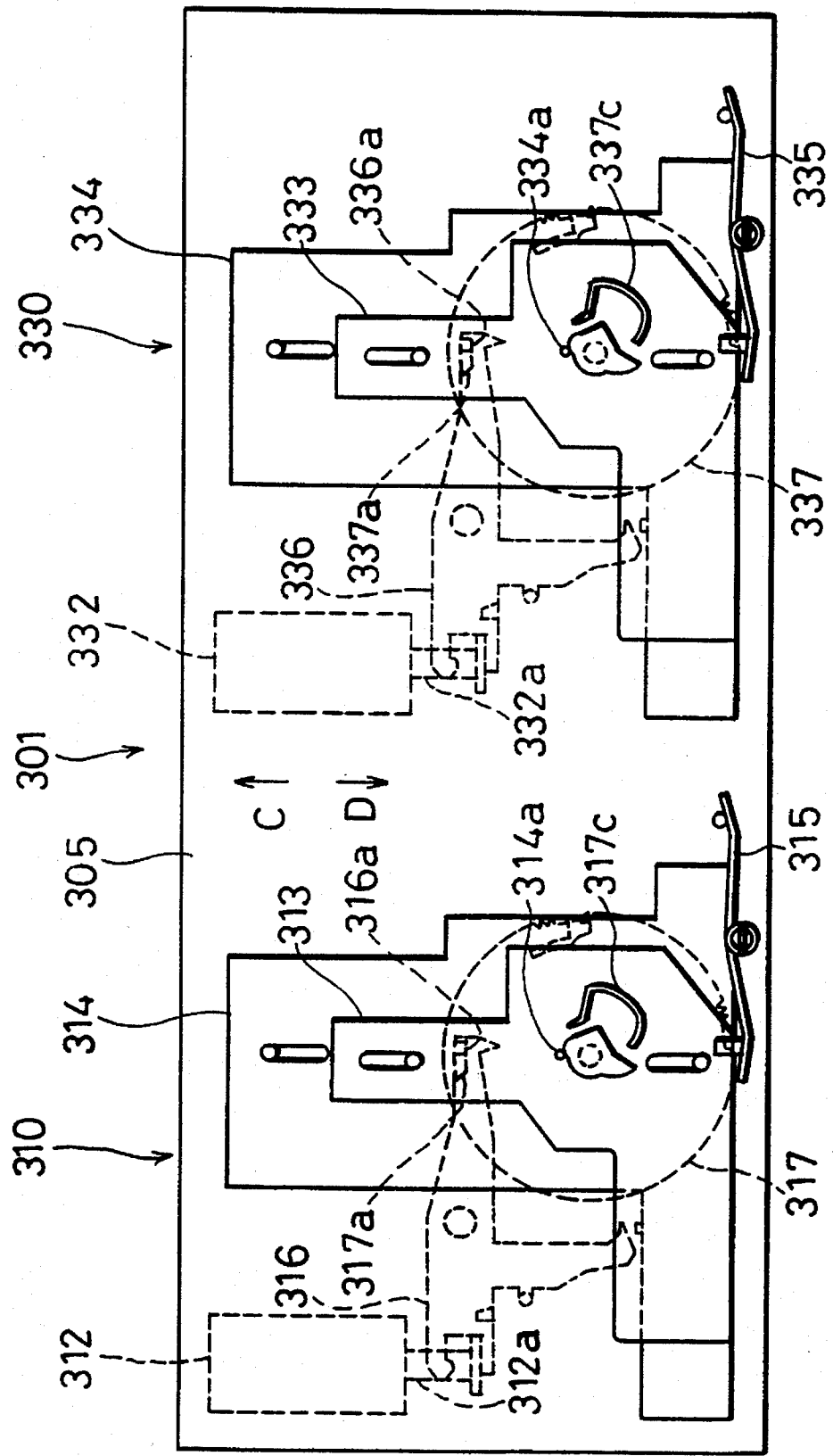
FIG. 38 is a plan view illustrating a tape transport mechanism shown in FIG. 37 in the stopped mode.
Figure 39:
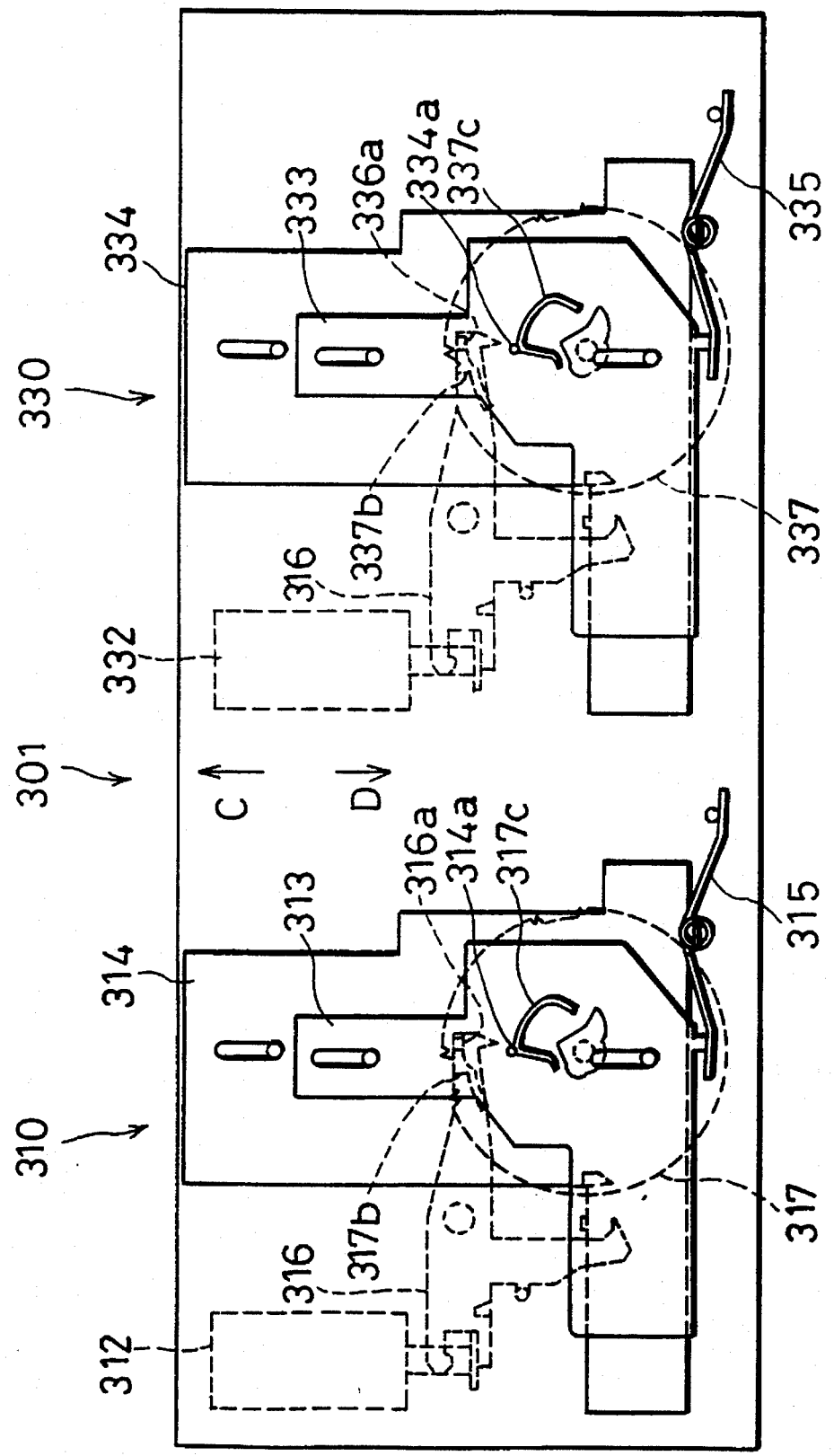
FIG. 39 is a plan view illustrating the structure of FIG. 38 in the dubbing mode.

FIG. 36 shows the construction of the tape transport mechanism of the above-mentioned single-cassette-type magnetic recording-reproduction apparatus. Among the members shown in FIG. 1, those members to be used in this construction are: the solenoid 12, the second head mount 51, the second over-stroke lever 52, the second over-stroke-lever spring 53, the second pinch-roller lever 55, the second pinch roller 56, the second capstan 57, the second idler lever 58, the second idler gear 59, the spring 60, the second take-up reel mount 61, the solenoid lever 66, and the cam gear 67, as well as the members shown in FIG. 6, such as the second feed reel mount 62, the FF gear 63, the FF/REW lever 64, the FF/REW gear 65, and the fly gear 68. In contrast, among the members shown in FIG. 1, those members which are not used are: the tape-end detection switch 13, the first head mount 21, the first over-stroke-lever spring 22, the first over-stroke lever 23, the first take-up reel mount 24, the first pinch-roller lever 25, the first pinch roller 26, the first capstan 27, the first idler lever 28, the first idler gear 29, and the spring 30. Additionally, the base plate 14 has a size equivalent to the second-mechanism section 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A double-cassette magnetic recording-reproduction apparatus comprising:

a first shifting member that engages a first-cassette-use magnetic head and that is shiftable in both an advancing and retracting manner to an operable position, so as to allow the first-cassette-use magnetic head to shift so that a magnetic tape in a first cassette is subject to at least a recording operation or a reproducing operation as well as to a retracted position so as to allow the first-cassette-use magnetic head to shift in a reverse direction wherein the recording or reproducing operations are not available;

a second shifting member that engages a third shifting member and that is shiftable in both an advancing and retracting manner to an advanced position so as to place the third shifting member at an operable position so that a second-cassette-use magnetic head is shifted to effect at least a recording or reproducing operation with respect to a magnetic tape in a second cassette, as well as to a retracted position so as to place the third shifting member at an inoperable position so that the second-cassette-use magnetic head is shifted in a reverse direction to render the recording or reproducing operations inoperable, the second-cassette-use magnetic head being engaged by the third shifting member;

a shift-blocking member that is allowed to shift to a shift-blocking position so as to block the movement of the third shifting member toward the operable position by contacting the third shifting member, even when the second shifting member has shifted to an advanced position;

an operation-switching member that shifts in an advancing and retracting manner following the movement of the second shifting member, while engaging the second shifting member, and that is shiftable to a first position so as to allow the shift-blocking member to be shifted to the shift-blocking position, as well as allowing the first shifting member to be shifted to the operable position by contacting the first shifting member and by the resulting movement of the second shifting member to the advanced position, and to a second position so as to prohibit the shift-blocking member from being shifted to the shift-blocking position as well as prohibiting the first shifting member from being shifted to the operable position; and driving means for shifting the second shifting member to the advanced position as well as to the retracted position and for shifting the operation-switching member to the first position as well as to the second position.

2. A double-cassette magnetic recording-reproduction apparatus comprising:

a first shifting member that engages a first-cassette-use magnetic head and that is shiftable in both an advancing and retracting manner to an operable position, so as to allow the first-cassette-use magnetic head to shift so that a magnetic tape in a first cassette is subject to at least a recording operation or a reproducing operation as well as to a retracted position so as to allow the first-cassette-use magnetic head to shift in a reverse direction wherein the recording or reproducing operations are not available;

a second shifting member that engages a third shifting member and that is shiftable in both an advancing and retracting manner to an advanced position so as to place the third shifting member at an operable position so that a second-cassette-use magnetic head is shifted to effect at least a recording or a reproducing operation with respect to a magnetic tape in a second cassette, as well as to a retracted position so as to place the third shifting member at an inoperable position so that the second-cassette-use magnetic head is shifted in a reverse direction to render the recording or reproducing operations inoperable, the second-cassette-use magnetic head being engaged by the third shifting member;

a shift-blocking member that is allowed to shift to a shift-blocking position so as to block the movement of the third shifting member toward the operable position by contacting the third shifting member, even when the second shifting member has shifted to an advanced position;

an operation-switching member that shifts in an advancing and retracting manner following the movement of the second shifting member, while engaging the second shifting member, and that is shiftable to a first position so as to allow the shift-blocking member to be shifted to the shift-blocking position, as well as allowing the first shifting member to be shifted to the operable position by contacting the first shifting member and by the resulting movement of the second shifting member to the advanced position, to a second position so as to prohibit the shift-blocking member from being shifted to the shift-blocking position as well as prohibiting the first shifting member from being shifted to the operable position; and to a third position that prohibits the shift-blocking member from being shifted to the shift-blocking position as well as permitting the first shifting member to be shifted to the operable position following the movement of the second shifting member to the advanced position, the operation-switching member being shifted in advancing and retracting manners following the movement of the second shifting member; and driving means for shifting the second shifting member to the advanced position as well as to the retracted position and for shifting the operation-switching member to the first position, to the second position, and to the third position.

3. The double-cassette magnetic recording-reproduction apparatus as defined in claim 2, further comprising:

a first reel mount on the first-cassette side for taking up the magnetic tape by engaging the first reel of the first cassette;

a first idler gear for transmitting a rotation force in a tape-taking-up direction to the first reel mount on the first-cassette side; and a first idler lever to which the first idler gear is fixed, wherein the first idler lever, when the first shifting member is placed at the operable position, is brought into a state for enabling an engagement between the first reel mount on the first-cassette side and the first idler gear through the movement of the first shifting member to the operable position, and the first idler lever, when the first shifting member is placed at the inoperable position, is brought into a state for inhibiting the engagement between the first reel mount on the first-cassette side and the first idler gear through the movement of the first shifting member to the inoperable position.

4. The double-cassette magnetic recording-reproduction apparatus as defined in claim 2, further comprising:

a first reel mount on the second-cassette side for taking up the magnetic tape by engaging the first reel of the second cassette, wherein the shift-blocking member includes a second idler gear for transmitting a rotation force in a tape-taking-up direction to the first reel mount on the second-cassette side and a second idler lever to which the second idler gear is fixed, the second idler lever being arranged so that, when driven by the operation-switching member to be located at the shift-blocking-position, it is brought into a state for inhibiting an engagement between the first reel mount on the second-cassette side and the second idler gear.

5. The double-cassette magnetic recording-reproduction apparatus as defined in claim 2, wherein the second idler lever, when the second shifting member is placed at the advanced position, is brought into a state for enabling an engagement between the first reel mount on the second-cassette side and the second idler gear through the movement of the second shifting member to the advanced position, and the second idler lever, when the second shifting member is placed at the retracted position, is brought into a state for inhibiting the engagement between the first reel mount on the second-cassette side and the second idler gear through the movement of the second shifting member to the retracted position.

6. The double-cassette magnetic recording-reproduction apparatus as defined in claim 2, further comprising:

a first capstan and a first pinch roller for cooperatively driving the magnetic tape of the first cassette while sandwiching the magnetic tape in between, wherein the first shifting member, when shifted to the operable position, allows the first pinch roller to be pressed onto the first capstan.

7. The double-cassette magnetic recording-reproduction apparatus as defined in claim 2, further comprising:

a second capstan and a second pinch roller for cooperatively driving the magnetic tape of the second cassette while sandwiching the magnetic tape in between, wherein the operation-switching member, when placed at the second position and at the third position, allows the second pinch roller to be pressed onto the second capstan when it is shifted in an advancing manner following the movement of the second shifting member to the advanced position.

8. The double-cassette magnetic recording-reproduction apparatus as defined in claim 7, wherein: the first through third positions of the operation-switching member are determined so that the first position is given as a position relatively the second pinch roller, and so that the second and the third positions are given as positions that are closer to the second pinch roller than to the first position; a second pinch-roller supporting member for supporting the second pinch roller is capable of pivoting in a pressing direction and in a departing direction to and from the second capstan; and when the second pinch roller is pressed onto the second capstan by the operation-switching member, the position of the second pinch roller in the advancing direction of the second shifting member is given as the same position both in the case of the operation-switching member at the second position and in the case of the operation-switching member at the third position.

9. The double-cassette magnetic recording-reproduction apparatus as defined in claim 2, further comprising:

a fourth shifting member that is shiftable in advancing and retracting manners to the operable position and to the inoperable position, following the advancing and retracting movements of the first shifting member, wherein a magnetic head used for the first cassette is installed on the fourth shifting member and a magnetic head used for the second cassette is installed on the third shifting member, the third shifting member and the fourth shifting member being set to have the same advancing and retracting directions to the operable position and to the inoperable position.

10. The double-cassette magnetic recording reproduction apparatus as defined in claim 2, wherein: the first cassette and the second cassette are loaded with the axial directions of their reels being parallel to each other, in positions that are aligned in a direction orthogonal to the axial direction; and the first shifting member is contained in a first mechanism section installed on the first-cassette side and the second shifting member, the shift-blocking member, the operation-switching member, the driving means, and a motor for providing a driving source to the driving means are contained in a second mechanism section installed on the second-cassette side wherein: the first shifting member is contained in a first mechanism section that is installed on the first-cassette side as a composing element;

the second shifting member, the shift-blocking member, the operation-switching member, the driving means, and a motor for providing a driving source to the driving means are contained in a second mechanism section installed on the second-cassette side as composing elements; and the composing elements on the second mechanism section are installed on the same base plate, except for the composing elements on the first mechanism section.

11. The double-cassette magnetic recording reproduction apparatus as defined in claim 2, wherein: the first cassette and the second cassette are loaded with the axial directions of their reels being parallel to each other in positions that are aligned in a direction orthogonal to the axial direction; the first shifting member and the second shifting member are urged by respective elastic members in a direction toward an inoperable position; the driving direction in which the operation-switching member is driven to the first through third positions is set to a direction that is orthogonal to the advancing and retracting directions of the second shifting member; and the first through third positions are given as positions that allow the operation-switching member to shift the first shifting member by engaging it when the operation-switching member is shifted following the movement of the second shifting member to the advanced position.

12. The double-cassette magnetic recording-reproduction apparatus as defined in claim 2, wherein the driving means includes a single cam means that is rotatively driven, the cam means being provided with a first cam for driving the second shifting member by engaging it as well as a second cam for driving the operation-switching member by engaging it.

13. The double-cassette magnetic recording reproduction apparatus as defined in claim 12, further comprising:

a second reel mount on the second cassette;

a fast-forward/rewind gear for transmitting a rotation force used for the rewind and fast-forward of the magnetic tape to the first reel mount on the second-cassette side as well as to the second reel mount on the second cassette side; and a fast-forward/rewind lever to which the fast-forward/rewind gear is fixed, wherein the cam means includes a third cam that is formed into a round shape and is allowed to rotate in one direction so as to shift the fast-forward/rewind lever, the first cam and the second cam being installed on a first round-surface of the cam means, the third cam being installed on a second round-surface of the cam means.

14. The double-cassette magnetic recording reproduction apparatus as defined in claim 12, wherein:

the driving means further comprises stopping means for stopping the cam means at a predetermined stop position by engaging the cam means;

the operation-switching member is urged by an elastic member in a direction from the first position to the second position through the third position; and the second cam of the cam means is provided with a first-position-use cam having a circular arc shape that shifts the operation-switching member to the first position, a third-position-use cam having a circular arc shape that shifts the operation-switching member to the third position, and a stand-by-position-use cam that maintains the operation-switching member at a stand-by position, the third-position-use cam being installed on an inner-surface side from the first-position-use cam with a diameter smaller than that of the first-position-use cam, the first- and third-position-use cams each having a start-edge portion that forms a front-edge position in a rotation direction of the cam means, the start-edge portion of the third-position-use cam being located at a position beyond the start-edge portion of the first-position-use cam, the stand-by-position-use cam being placed at a forward position from the start-edge portions of the first- and third-position-use cams, the stopping means and the operation-switching member being provided with engaging sections, the engaging sections being arranged to engage each other so that the operation-switching member, urged by the elastic member, is blocked from moving in an urged direction when the stopping means is shifted in such a direction as to release an engagement for stopping the cam means.

15. The double-cassette magnetic recording-reproduction apparatus as defined in claim 14, wherein the stopping means includes a stopping lever for engaging the cam means and a solenoid for driving the stopping lever in an engaging direction to the cam means and in a disengaging direction from the cam means.

* * * * *